United States Patent
Bansal et al.

(10) Patent No.: US 10,936,216 B2
(45) Date of Patent: Mar. 2, 2021

(54) METHOD AND SYSTEM FOR STORAGE EXHAUSTION ESTIMATION

(71) Applicant: EMC IP Holding Company LLC, Hopkinton, MA (US)

(72) Inventors: Aaditya Rakesh Bansal, Bangalore (IN); Tushar B Dethe, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/142,553

(22) Filed: Sep. 26, 2018

(65) Prior Publication Data

US 2020/0097198 A1  Mar. 26, 2020

(51) Int. Cl.
*G06F 3/06* (2006.01)

(52) U.S. Cl.
CPC .......... *G06F 3/0631* (2013.01); *G06F 3/0604* (2013.01); *G06F 3/065* (2013.01); *G06F 3/067* (2013.01); *G06F 3/0653* (2013.01)

(58) Field of Classification Search
CPC ...... G06F 3/0631; G06F 3/065; G06F 3/0653; G06F 3/067; G06F 3/0614
See application file for complete search history.

(56) References Cited

U.S. PATENT DOCUMENTS

| | | | | |
|---|---|---|---|---|
| 8,712,950 | B2* | 4/2014 | Smith | G06F 9/5011 706/52 |
| 8,751,463 | B1* | 6/2014 | Chamness | G06F 3/0608 707/693 |
| 9,383,936 | B1* | 7/2016 | Freitas | G06F 3/0641 |
| 9,864,658 | B1* | 1/2018 | Barcello | G06F 11/1453 |
| 2007/0294206 | A1* | 12/2007 | Korman | G06F 3/0676 |
| 2008/0091748 | A1* | 4/2008 | Beniyama | G06F 3/0608 |
| 2016/0306555 | A1* | 10/2016 | Banerjee | G06F 3/0604 |
| 2019/0306555 | A1* | 10/2019 | Oh | H04N 21/440218 |

OTHER PUBLICATIONS

Vaughn, Christy et. al., "Soothsayer: Predicting Capacity Usage in Backup Storage Systems," Oct. 2015, IEEE, reference can be found through https://ieeexplore.ieee.org/document/7330192.*

* cited by examiner

Primary Examiner — Adam M Queler
Assistant Examiner — Richard L Sutton
(74) Attorney, Agent, or Firm — Chamberlain, Hrdlicka, White, Williams & Aughtry

(57) ABSTRACT

A method and system for storage exhaustion estimation. Specifically, the method and system disclosed herein entail deriving a timeline for the depletion of available storage capacity on a backup storage array based on the data backup dynamics of various user clients. The timeline may deduce storage capacity availability in terms of future successful backup cycles, which may serve to address critical issues involving the administration of the backup storage array.

17 Claims, 15 Drawing Sheets

@ T1

ΔT = 24 hours:
Default Backup Frequency (DBF) = 1 (per day)

Backup Cycle Timeline: T1
Expected Cycle Count (ECC) = 1

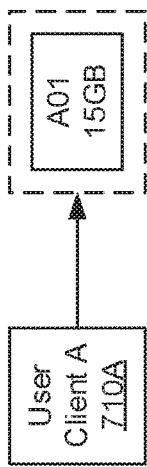

User Client A
710A

A01
15GB

Total Transferred Capacity (TTC): 15GB
Client Backup Frequency (CBF): ACC / ECC = 1 / 1 = 1 cycle/day
Normalized Transferred Capacity Rate (NTCR): (TCC / ECC) x (CBF / DBF) = (15 / 1) x (1 / 1) = 15GB/cycle
Deduplicated Data Capacity Rate (DDCR): NTCR / GDR = 15 / 20 = 0.75GB/cycle
Index Capacity for Deduplication Rate (ICDR): DIC x (NTCR − DDCR) = 0.01 x (15 − 0.75) = 0.14GB/cycle User Client A
DIC = 0.01

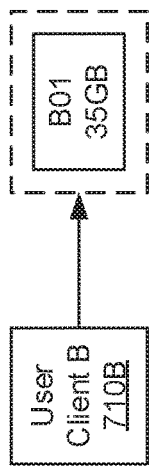

User Client B
710B

B01
35GB

Total Transferred Capacity (TTC): 35GB
Client Backup Frequency (CBF): ACC / ECC = 1 / 1 = 1 cycle/day
Normalized Transferred Capacity Rate (NTCR): (TCC / ECC) x (CBF / DBF) = (35 / 1) x (1 / 1) = 35GB/cycle
Deduplicated Data Capacity Rate (DDCR): NTCR / GDR = 35 / 20 = 1.75GB/cycle
Index Capacity for Deduplication Rate (ICDR): DIC x (NTCR − DDCR) = 0.02 x (35 − 1.75) = 0.67GB/cycle User Client B
DIC = 0.02

ΔT = 24 hours;
Default Backup Frequency (DBF) = 1 (per day)

Backup Cycle Timeline: T1 | T2
Expected Cycle Count (ECC) = 2

User Client A 710A

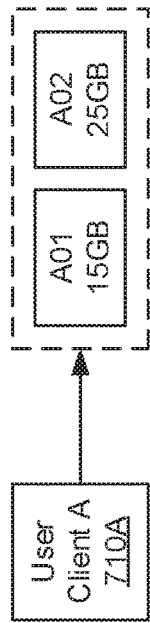
A01 15GB | A02 25GB

User Client A
DIC = 0.01

Total Transferred Capacity (TTC): 15 + 25 = 40GB
Client Backup Frequency (CBF): ACC / ECC = 2 / 2 = 1 cycle/day
Normalized Transferred Capacity Rate (NTCR): (TTC / ECC) × (CBF / DBF) = (40 / 2) × (1 / 1) = 20GB/cycle
Deduplicated Data Capacity Rate (DDCR): NTCR / GDR = 20 / 20 = 1.00GB/cycle
Index Capacity for Deduplication Rate (ICDR): DIC × (NTCR − DDCR) = 0.01 × (20 − 1.00) = 0.19GB/cycle User Client B 710B

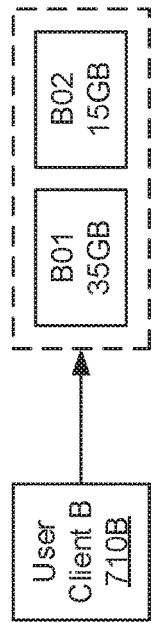
B01 35GB | B02 15GB

User Client B
DIC = 0.02

Total Transferred Capacity (TTC): 35 + 15 = 50GB
Client Backup Frequency (CBF): ACC / ECC = 2 / 2 = 1 cycle/day
Normalized Transferred Capacity Rate (NTCR): (TCC / ECC) × (CBF / DBF) = (50 / 2) × (1 / 1) = 25GB/cycle
Deduplicated Data Capacity Rate (DDCR): NTCR / GDR = 25 / 20 = 1.25GB/cycle
Index Capacity for Deduplication Rate (ICDR): DIC × (NTCR − DDCR) = 0.02 × (25 − 1.25) = 0.48GB/cycle

*FIG. 7C*

ΔT = 24 hours;
Default Backup Frequency (DBF) = 1 (per day)

Backup Cycle Timeline: T1 | T2 | T3
Expected Cycle Count (ECC) = 3

@ T3

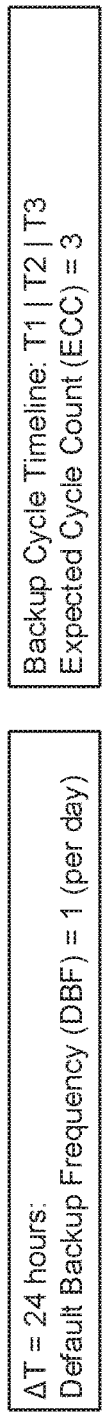

User Client A
710A

| A01 | A02 | A03 |
|-----|-----|-----|
| 15GB | 25GB | 10GB |

User Client A
DIC = 0.01

Total Transferred Capacity (TTC): 15 + 25 + 10 = 50GB
Client Backup Frequency (CBF): ACC / ECC = 3 / 3 = 1 cycle/day
Normalized Transferred Capacity Rate (NTCR): (TTC / ECC) × (CBF / DBF) = (50 / 3) × (1 / 1) = 16.7GB/cycle
Deduplicated Data Capacity Rate (DDCR): NTCR / GDR = 16.7 / 20 = 0.83GB/cycle
Index Capacity for Deduplication Rate (ICDR): DIC × (NTCR − DDCR) = 0.01 × (16.7 − 0.83) = 0.16GB/cycle User Client B
710B

| B01 | B02 | B03 |
|-----|-----|-----|
| 35GB | 15GB | 00GB |

User Client B
DIC = 0.02

Total Transferred Capacity (TTC): 35 + 15 + 0 = 50GB
Client Backup Frequency (CBF): ACC / ECC = 2 / 3 = 0.67 cycles/day
Normalized Transferred Capacity Rate (NTCR): (TCC / ECC) × (CBF / DBF) = (50 / 3) × (0.67 / 1) = 11.1GB/cycle
Deduplicated Data Capacity Rate (DDCR): NTCR / GDR = 11.1 / 20 = 0.56GB/cycle
Index Capacity for Deduplication Rate (ICDR): DIC × (NTCR − DDCR) = 0.02 × (11.1 − 0.56) = 0.21GB/cycle

ΔT = 24 hours;
Default Backup Frequency (DBF) = 1 (per day)

Backup Cycle Timeline: T1 | T2 | T3 | T4
Expected Cycle Count (ECC) = 4

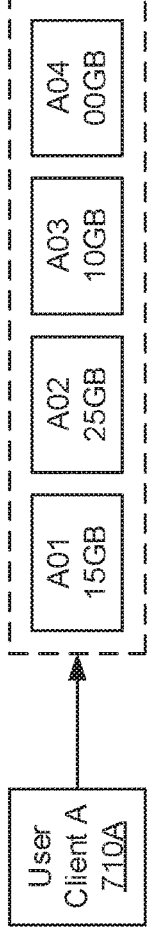

User Client A
710A

| A01 | A02 | A03 | A04 |
|---|---|---|---|
| 15GB | 25GB | 10GB | 00GB |

User Client A
DIC = 0.01

Total Transferred Capacity (TTC): 15 + 25 + 10 + 0 = 50GB
Client Backup Frequency (CBF): ACC / ECC = 3 / 4 = 0.75 cycles/day
Normalized Transferred Capacity Rate (NTCR): (TTC / ECC) × (CBF / DBF) = (50 / 4) × (0.75 / 1) = 9.4GB/cycle
Deduplicated Data Capacity Rate (DDCR): NTCR / GDR = 9.4 / 20 = 0.47GB/cycle
Index Capacity for Deduplication Rate (ICDR): DIC × (NTCR − DDCR) = 0.01 × (9.4 − 0.47) = 0.09GB/cycle

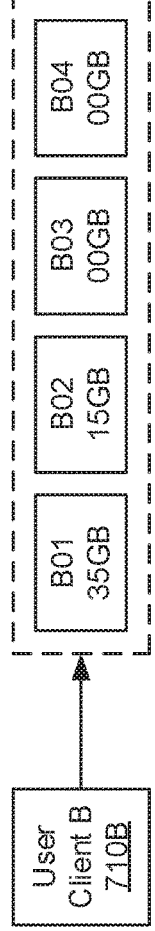

User Client B
710B

| B01 | B02 | B03 | B04 |
|---|---|---|---|
| 35GB | 15GB | 00GB | 00GB |

User Client B
DIC = 0.02

Total Transferred Capacity (TTC): 35 + 15 + 0 + 0 = 50GB
Client Backup Frequency (CBF): ACC / ECC = 2 / 4 = 0.50 cycles/day
Normalized Transferred Capacity Rate (NTCR): (TCC / ECC) × (CBF / DBF) = (50 / 4) × (0.50 / 1) = 6.3GB/cycle
Deduplicated Data Capacity Rate (DDCR): NTCR / GDR = 6.3 / 20 = 0.31GB/cycle
Index Capacity for Deduplication Rate (ICDR): DIC × (NTCR − DDCR) = 0.02 × (6.3 − 0.31) = 0.12GB/cycle

ΔT = 24 hours;
Default Backup Frequency (DBF) = 1 (per day)

Backup Cycle Timeline: T1 | T2 | T3 | T4 | T5
Expected Cycle Count (ECC) = 5

User Client A
710A

| A01 15GB | A02 25GB | A03 10GB | A04 00GB | A05 12GB |

User Client A
DIC = 0.01

Total Transferred Capacity (TTC): 15 + 25 + 10 + 0 + 12 = 62GB
Client Backup Frequency (CBF): ACC / ECC = 4 / 5 = 0.80 cycles/day
Normalized Transferred Capacity Rate (NTCR): (TTC / ECC) × (CBF / DBF) = (62 / 5) × (0.8 / 1) = 9.9GB/cycle
Deduplicated Data Capacity Rate (DDCR): NTCR / GDR = 9.9 / 20 = 0.50GB/cycle
Index Capacity for Deduplication Rate (ICDR): DIC × (NTCR − DDCR) = 0.01 × (9.9 − 0.50) = 0.09GB/cycle User Client B
710B

| B01 35GB | B02 15GB | B03 00GB | B04 00GB | B05 50GB |

User Client B
DIC = 0.02

Total Transferred Capacity (TTC): 35 + 15 + 0 + 0 + 50 = 100GB
Client Backup Frequency (CBF): ACC / ECC = 3 / 5 = 0.60 cycles/day
Normalized Transferred Capacity Rate (NTCR): (TCC / ECC) × (CBF / DBF) = (100 / 5) × (0.60 / 1) = 12GB/cycle
Deduplicated Data Capacity Rate (DDCR): NTCR / GDR = 12 / 20 = 0.60GB/cycle
Index Capacity for Deduplication Rate (ICDR): DIC × (NTCR − DDCR) = 0.02 × (12 − 0.60) = 0.23GB/cycle

FIG. 7F

| | T1 | T2 | T3 | T4 | T5 |
|---|---|---|---|---|---|
| User Client A 710A | DDCR = 0.75GB + ICDR = 0.14GB<br>TDCR = 0.89GB | DDCR = 1.00GB + ICDR = 0.19GB<br>TDCR = 1.19GB | DDCR = 0.83GB + ICDR = 0.16GB<br>TDCR = 0.99GB | DDCR = 0.47GB + ICDR = 0.09GB<br>TDCR = 0.56GB | DDCR = 0.50GB + ICDR = 0.09GB<br>TDCR = 0.59GB |
| User Client B 710B | DDCR = 1.75GB + ICDR = 0.67GB<br>TDCR = 2.42GB | DDCR = 1.25GB + ICDR = 0.48GB<br>TDCR = 1.73GB | DDCR = 0.56GB + ICDR = 0.21GB<br>TDCR = 0.77GB | DDCR = 0.31GB + ICDR = 0.12GB<br>TDCR = 0.43GB | DDCR = 0.60GB + ICDR = 0.23GB<br>TDCR = 0.83GB |

Storage Maximum Capacity = 100GB

| | T1 | T2 | T3 | T4 | T5 |
|---|---|---|---|---|---|
| FSC | 0.89 + 2.42 = 3.31GB | 3.31 + 1.19 + 1.73 = 6.23GB | 6.23 + 0.99 + 0.77 = 7.99GB | 7.99 + 0.56 + 0.43 = 8.98GB | 8.98 + 0.59 + 0.83 = 10.4GB |
| ASC | 100 − 3.31 = 96.69GB | 100 − 6.23 = 93.77GB | 100 − 7.99 = 92.01GB | 100 − 8.98 = 91.02GB | 100 − 10.4 = 89.60GB |
| SET | 96.69 / (0.89 + 2.42) = 29.2 Backup Cycles | 93.77 / (1.19 + 1.73) = 32.1 Backup Cycles | 92.01 / (0.99 + 0.77) = 52.3 Backup Cycles | 91.02 / (0.56 + 0.43) = 91.9 Backup Cycles | 89.60 / (0.59 + 0.83) = 63.1 Backup Cycles |

*FIG. 7G*

METHOD AND SYSTEM FOR STORAGE EXHAUSTION ESTIMATION

BACKGROUND

Currently, backup infrastructure information is limited to the available capacity at any given point-in-time. Such information does not take into account any history of incoming data submitted for consolidation onto a storage system. Further, such information lacks the usefulness of disclosing tentative deadlines in the future where available storage capacity stands to be exhausted.

BRIEF DESCRIPTION OF DRAWINGS

FIGS. 7A-7G show various aspects of an example scenario in accordance with one or more embodiments of the invention.

DETAILED DESCRIPTION

Figure 1:
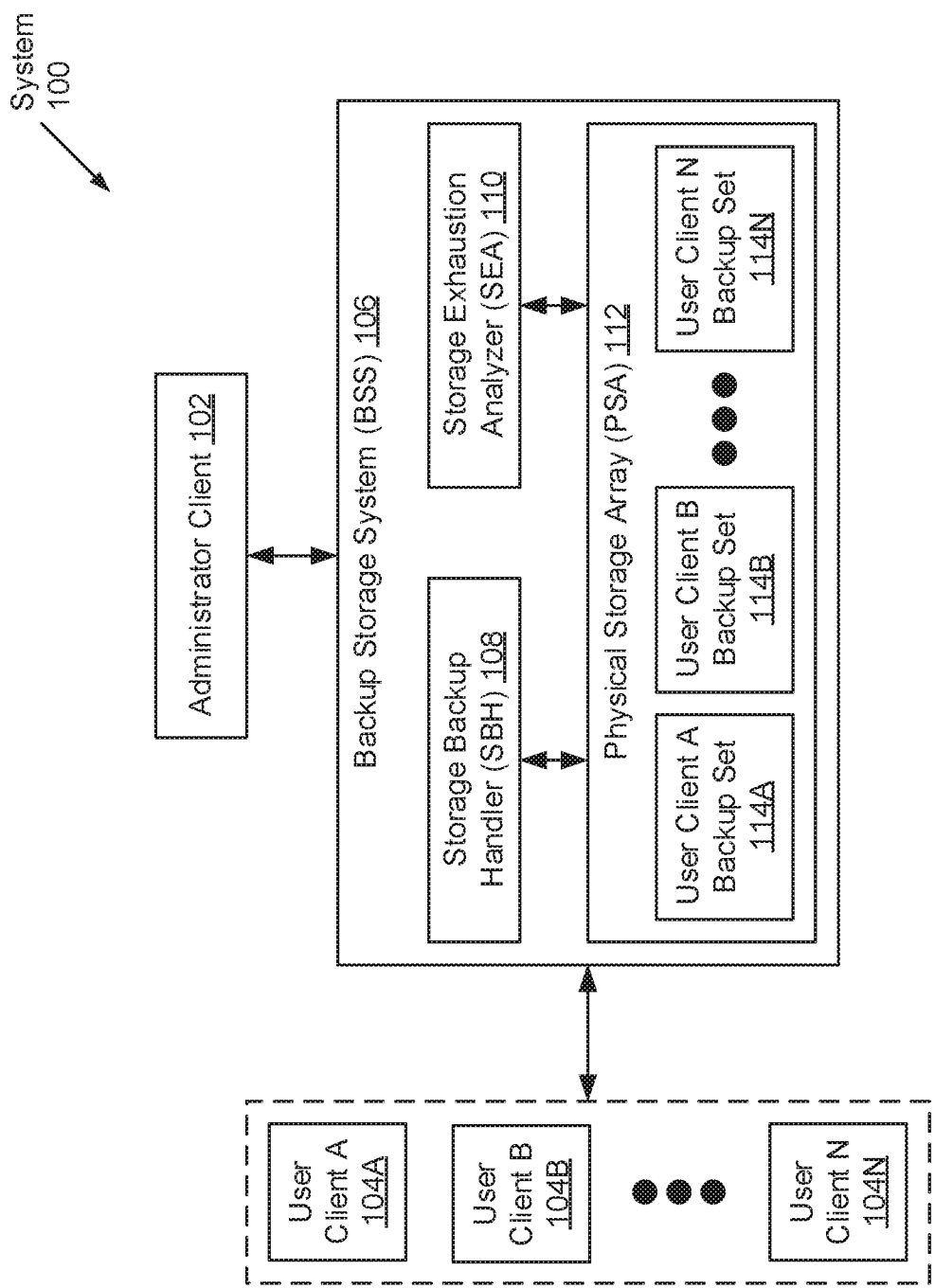
FIG. 1 shows a system in accordance with one or more embodiments of the invention.

Specific embodiments of the invention will now be described in detail with reference to the accompanying figures. In the following detailed description of the embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1-7G, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to necessarily imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and a first element may encompass more than one element and succeed (or precede) the second element in an ordering of elements.

In general, embodiments of the invention relate to a method and system for storage exhaustion estimation. Specifically, one or more embodiments of the invention entails deriving a timeline for the depletion of available storage capacity on a backup storage array based on the data backup dynamics of various user clients. The timeline may deduce storage capacity availability in terms of future successful backup cycles, which may serve to address critical issues involving the administration of the backup storage array.

In one embodiment of the invention, an estimation for the depletion of available storage capacity may prove to be useful information when considering: the transfer of backups from one storage system to another; the planning of backup strategies in terms of policies for different types of backed-up data (e.g., reducing the backup frequency of less vital information or changing the retention of non-critical backups); and/or the resource handling to support backup infrastructure needs.

FIG. 1 shows a system in accordance with one or more embodiments of the invention. The system (100) may include an administrator client (102) operatively connected to a backup storage system (BSS) (106) which, in turn, may be operatively connected to one or more user clients (104A-104N). Each of these components is described below.

In one embodiment of the invention, the aforementioned components may be directly or indirectly connected to one another through a network (e.g., a local area network (LAN), a wide area network (WAN) such as the Internet, a mobile network, or any other network) (not shown). The network may be implemented using any combination of wired and/or wireless connections. In embodiments in which the aforementioned components are indirectly connected, there may be other networking components or systems (e.g., switches, routers, gateways, etc.) that facilitate communication, information exchange, and/or resource sharing between and amongst the various system (100) components. Further, the aforementioned components may communicate with one another using any combination of wired and/or wireless communication protocols.

In one embodiment of the invention, the administrator client (102) may be any physical computing system operated by an administrator of the BSS (106). An administrator of the BSS (106) may be at least one individual or an entity whom may be responsible for overseeing operations and maintenance pertinent to the BSS (106). Further, the administrator client (102) may include functionality to: receive, from the BSS (106), information pertaining to exhaustion timelines for the physical storage residing on the BSS (106) in the form of, for example, reports and/or alerts. One of ordinary skill will appreciate that the administrator client (102) may perform other functionalities without departing from the scope of the invention. Examples of the administrator client (102) may include, but are not limited to, a desktop computer, a laptop computer, a tablet computer, a server, a mainframe, a smartphone, or any other computing system similar to the exemplary computing system shown in FIG. 6.

In one embodiment of the invention, each user client (104A-104N) may be any physical computing system operated by a user of the BSS (106). A user of the BSS (106) may be at least one individual or an entity whom utilizes the BSS (106) for data backup, archiving, and/or disaster recovery purposes. Further, each user client (104A-104N) may include functionality to: periodically generate data backups of various information residing on the user client (104A-104N); submit the generated data backups to the BSS (106) for remote consolidation; and, when certain occasions arise (e.g., failure events), retrieve the data backups from the BSS (106) to restore the various information on the user client (104A-104N). One of ordinary skill will appreciate that each user client (104A-104N) may perform other functionalities without departing from the scope of the invention. Examples of each user client (104A-104N) may include, but are not limited to, a desktop computer, a laptop computer, a tablet computer, a server, a mainframe, a smartphone, or any other computing system similar to the exemplary computing system shown in FIG. 6.

In one embodiment of the invention, the BSS (106) may represent a data backup, archiving, and/or disaster recovery storage system. The BSS (106) may be implemented using one or more servers (not shown). Each server may be a physical server (i.e., which may reside in a datacenter) or a virtual server (i.e., which may reside in a cloud computing environment). In one embodiment of the invention, the BSS (106) may be implemented using one or more computing systems similar to the exemplary computing system shown in FIG. 6. Furthermore, the BSS may include a storage backup handler (SBH) (108), a storage exhaustion analyzer (SEA) (110), and a physical storage array (PSA) (112). Each of these subcomponents is described below.

In one embodiment of the invention, the SBH (108) may be a computer program or process (i.e., an instance of a computer program) that executes on the underlying hardware of the BSS (106). Specifically, the SBH (108) may be a computer program or process tasked with, at least in part, managing data backup and recovery operations. To that extent, the SBH (108) may include functionality to: receive data backups for various information from one or more user clients (104A-104N); consolidate the received data backups in the PSA (112); and, when requested, retrieve the data backups from the PSA (112) to subsequently provide back to one or more user clients (104A-104N) during recovery operations. In one embodiment of the invention, the SBH (108) may include further functionality to: allocate user client backup sets (114A-114N) (described below); and generate and/or update metadata (see e.g., FIG. 2) describing one or more of the aforementioned user client backup sets (114A-114N), one or more data backups, and/or the BSS (106). One of ordinary skill will appreciate that the SBH (108) may perform other functionalities without departing from the scope of the invention.

In one embodiment of the invention, the SEA (110) may be a computer program or process (i.e., an instance of a computer program) that executes on the underlying hardware of the BSS (106). Specifically, the SEA (110) may be a computer program or process tasked with estimating storage exhaustion timelines pertinent to the BSS (106) in accordance with one or more embodiments of the inventions (see e.g., FIGS. 3A-5). To that extent, the SEA (110) may leverage information gauging the effective remaining capacity of the BSS (106), the deduplication ratio of the BSS (106) (if applicable), the incoming data backup rate for various user clients (104A-104N), the capacity occupied by indexes for deduplication (if applicable), and other metadata (see e.g., FIG. 2). Further, the SEA (110) may include functionality to: provide estimated storage exhaustion timelines to the administrator client (102); and perform one or more proactive actions (described below) based on the estimated storage exhaustion timelines. One of ordinary skill will appreciate that the SEA (110) may perform other functionalities without departing from the scope of the invention.

In one embodiment of the invention, the PSA (112) may represent a collection of one or more physical storage devices and/or media on which various forms of information—pertinent to one or more user clients (104A-104N)—may be consolidated. The one or more physical storage devices and/or media may or may not be of the same type. Further, the information consolidated in the PSA (112) may be arranged by way of any storage mechanism (e.g., a filesystem, a collection of tables or records, etc.). In one embodiment of the invention, the PSA (112) may be implemented using persistent (i.e., non-volatile) storage. Examples of persistent storage may include, but are not limited to: optical storage, magnetic storage, NAND Flash Memory, NOR Flash Memory, Magnetic Random Access Memory (M-RAM), Spin Torque Magnetic RAM (ST-MRAM), Phase Change Memory (PCM), or any other storage defined as non-volatile Storage Class Memory (SCM).

In one embodiment of the invention, the PSA (112) may store one or more user client backup sets (114A-114N). Each user client backup set (114A-114N) may represent a collection of one or more user client backups (not shown), which may retain snapshots of state pertinent to a respective user client (104A-104N) at various recovery points-in-time. Further, each user client backup set (114A-114N) may be a logical container, a data object, or a data structure that stores user client state and associated metadata. Moreover, each user client backup set (114A-114N) may span across one or more physical storage devices and/or media that implement, at least in part, the PSA (112).

While FIG. 1 shows a configuration of components, other system configurations may be used without departing from the scope of the invention. For example, the system (100) may further include additional BSSs (106), which may be operatively connected to the administrator client (102) and the same set of user clients (104A-104N) or a different set entirely (not shown).

Figure 2:
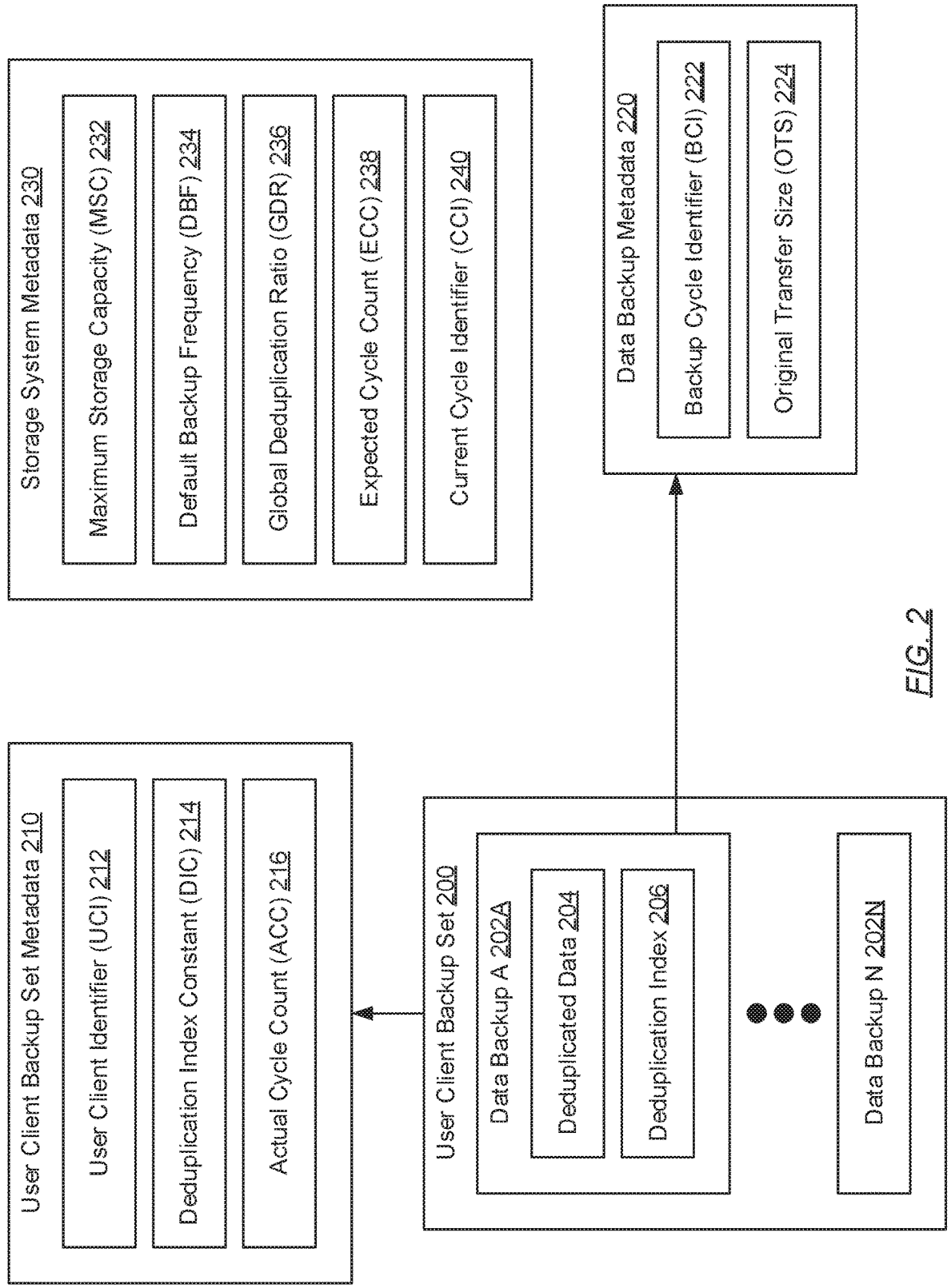
FIG. 2 shows a user client backup set and various metadata in accordance with one or more embodiments of the invention.

FIG. 2 shows a user client backup set and various metadata in accordance with one or more embodiments of the invention. As described above, each user client backup set (200) may represent a collection of one or more user client backups (also referred to herein as data backups) (202A-202N). Further, each data backup (202A-202N) may refer to a logical container, a data object, or a data structure that retains user client state, respective to a user client, associated with a particular recovery point-in-time. Moreover, each data backup (202A-202N) may retain user client state that may have undergone data deduplication prior to storage. Data deduplication may refer to a data compression technique directed to eliminating duplicate (or redundant) blocks or chunks of data, thereby reducing storage overhead. Through the data deduplication process, submitted or transferred data (e.g., user client state) may be reduced to, and subsequently consolidated as, deduplicated data (204) and a corresponding deduplication index (206). Each of these data items is described below.

In one embodiment of the invention, deduplicated data (204) may encompass a set of one or more data blocks or chunks (not shown). Each data chunk may be a fragment or a partition of pre-deduplicated user client state (i.e., user client state submitted for consolidation on the backup storage system (BSS) (see e.g., FIG. 1) by a user client). Further, each data chunk may be a unique byte pattern that may be identified repeatedly (i.e., one or more times) throughout the pre-deduplicated user client state. Moreover, the size of each data chunk may be determined by default or may be set, by an administrator, as a configuration parameter of the data deduplication process.

In one embodiment of the invention, a deduplication index (206) may be a data object or structure that stores one or more fingerprints (not shown). A fingerprint may be a digital signature (i.e., a bit string or a string of characters including letters, numbers, symbols, etc.) that uniquely identifies a data chunk (described above) that constitutes, at least in part, the deduplicated data (204). Each fingerprint may be calculated by submitting the respective data chunk through a hash function, which may employ any combination of existing and/or future developed cryptographic algorithms. As such, each fingerprint may be a hash value, a hash code, or a digest outputted by the hash function given a data chuck for input.

In one embodiment of the invention, metadata describing each user client backup set (200) may be maintained on the BSS. The aforementioned metadata, also referred to as user client backup set metadata (210) hereinafter, may include, but is not limited to, a user client identifier (UCI) (212), a deduplication index constant (DIC) (214), and an actual cycle count (ACC) (216). Each of these metadata items is described below.

In one embodiment of the invention, the UCI (212) may be an identifier corresponding (or assigned) to a user client with which the user client backup set (200) may be associated. The UCI (212) may be expressed by a string of characters (e.g., letters, numbers, symbols, etc.) that uniquely identifies a user client. Further, the UCI (212) may serve to distinguish the user client from other user clients and, further, a user client backup set (200) from other user client backup sets that may be allocated on the BSS. The UCI (212) may be generated and assigned to a user client, and their corresponding user client backup set (200), by the storage backup handler (SBH) and/or the administrator client (see e.g., FIG. 1). By way of an example, the UCI (212) may be an alphanumeric tag, or may be a N-bit integer (where N0) expressed in hexadecimal notation.

In one embodiment of the invention, the DIC (214) may be a numerical value representative of a proportionality constant associated with consolidated data (i.e., a user client backup set (200)) for a given user client. Specifically, the DIC (214) may track the ratio between storage capacities occupied by the deduplication indices (206) and deduplicated data (204), across the user client backup set (200), for the given user client. Occupied storage capacity may refer to the amount of storage space, measured in bytes and pertaining to at least a portion of the physical storage array (PSA) of the BSS, which may be consumed by any form of data—e.g., deduplication indices (206) and deduplicated data (204). By way of an example, the DIC (214) associated with consolidated data for a given user client may be represented through the unitless numerical value of 0.1, which would indicate that, for the given user client, the storage capacity occupied by deduplication indices (206) included in the user client backup set (200) is representative of one-tenth (i.e., $\frac{1}{10}^{th}$) of the storage capacity occupied by deduplicated data (204) included in the user client backup set (200).

Further, in one embodiment of the invention, where a user client backup set (200) includes one data backup (e.g., 202A), the DIC (214) may be determined from the relative storage capacities occupied by the deduplicated data (204) and the deduplication index (206) for the aforementioned one data backup (e.g., 202A). Alternatively, in another embodiment of the invention, where a user client backup set (200) includes more than one data backup (202A-202N), the DIC (214) may alternatively represent a summary statistic of the relative storage capacities occupied by the deduplicated data (204) and the deduplication index (206) pertaining to multiple data backups (202A-202N). A summary statistic may refer to a measure used to summarize a dataset, which may include, but are not limited to: location or central tendency measures (e.g., arithmetic mean, median, mode, and interquartile mean), spread or dispersion measures (e.g., standard deviation, variance, range, interquartile range, etc.), shape measures (e.g., skewness or kurtosis), and dependence measures (e.g., correlation). Accordingly, the DIC (214), for any given user client, may be a dynamic variable that updates based on the expansion of the respective user client backup set (200) (i.e., based on the consolidation of additional data backups (202A-202N)).

In one embodiment of the invention, the ACC (216), associated with a given user client, may represent a numerical counter that tracks the number of backup cycles during which the given user client submits user client state for consolidation on the BSS. That is, during each backup cycle, any given user client may or may not submit user client state for deduplication and, subsequently, consolidation. Any given user client may not submit user client state for various reasons. By way of an example, a user client may not submit user client state during a particular backup cycle because no changes had, or at least a minimal threshold of changes had not, transpired on the user client state since the previous backup cycle. During backup cycles where user client state may be submitted, the ACC (216) associated with the given user client may be incremented (e.g., by one). In contrast, during backup cycles where no user client state is submitted, the ACC (216) may not be updated.

In one embodiment of the invention, a backup cycle may refer to a periodically-occurring time window during which user client state, from one or more user clients, may be uploaded to the BSS. The backup cycle interval, or the interval of time between backup cycles, may encompass any granularity of time (e.g., hours, days, weeks, etc.). Further, the backup schedule for each user client may be synchronized to coincide with the backup cycle, which may be configured by an administrator of the BSS and/or datacenter.

In one embodiment of the invention, metadata describing each data backup (202A-202N) of a user client backup set (200) may also be maintained on the BSS. The aforementioned metadata, also referred to as data backup metadata (220) hereinafter, may include, but is not limited to, a backup cycle identifier (BCI) (222) and an original transfer size (OTS) (224). Each of these metadata items is described below.

In one embodiment of the invention, the BCI (222) may be an identifier corresponding (or assigned) to a backup cycle (described above) with which the data backup (202A-202N) may be associated. That is, the BCI (222) may serve to map a data backup (202A-202N) to the particular backup cycle during which the data backup (202A-202N) had been consolidated. Further, the BCI (222) may be expressed by a string of characters (e.g., letters, numbers, symbols, etc.) that uniquely identify a backup cycle and serves to distinguish the backup cycle from other backup cycles which have also transpired. The BCI (222) may be generated and assigned to a backup cycle by the SBH and/or the administrator client (see e.g., FIG. 1). By way of an example, the BCI (222) may be an alphanumeric tag, or may be a N-bit integer (where N>0) expressed in hexadecimal notation.

In one embodiment of the invention, the OTS (224), associated with a given data backup (202A-202N), may be a numerical value that records the original upload size of user client state that becomes the given data backup (202A-202N). That is, the OTS (224) retains a numerical value representative of the storage capacity required to store the submitted user client state prior to applying the data deduplication process. The OTS (224) may be expressed in bytes—e.g., kilobytes (KB), megabytes (MB), gigabytes (GB), terabytes (TB), etc.

In one embodiment of the invention, metadata describing the BSS may also be maintained on the BSS. The aforementioned metadata, also referred to as storage system metadata (230) hereinafter, may include, but is not limited to, a maximum storage capacity (MSC) (232), a default backup frequency (DBF) (234), a global deduplication ratio (GDR) (236), an expected cycle count (ECC) (238), and a current cycle identifier (CCI) (240). Each of these metadata items is described below.

In one embodiment of the invention, the MSC (232) may be a numerical value that captures the total storage capacity of the BSS, across all physical storage devices that constitute the BSS. For example, should the BSS form from five physical storage devices that include 10 TB, 100 TB, 35 TB, 70 TB, and 120 TB storage capacities, respectively, then the MSC (232) would represent the sum of the various individual storage capacities (i.e., 10 TB+100 TB+35 TB+70 TB+120 TB=335 TB).

In one embodiment of the invention, the DBF (234) may be a numerical value that reflects the number of times, in a given time duration, that backup cycles should be scheduled (or are expected) to occur. The DBF (234) may depend on the configured backup cycle interval (described above) and the aforementioned given time duration, which may be configurable by an administrator of the BSS and/or datacenter. For example, if the backup cycle interval is set for eight hours—i.e., meaning a backup cycle occurs every eight hours—and the given time duration is specified to span one day, then the DBF (234) would reflect the number of backup cycles that should occur in the span of one day (i.e., one day=24 hours/8 hours per cycle=4 cycles should transpire during the one day span).

In one embodiment of the invention, the GDR (236) may represent a quantitative indicator or measure of the effectiveness of the data deduplication process being applied to user client state prior to consolidation of the user client state as a data backup (202A-202N). The GDR (236) may be calculated as a summary statistic (described above) of various deduplication ratios associated with various data backups (202A-202N), respectively, across one or more user client backup sets (200) (i.e., across one or more user clients). Further, for any given data backup (202A-202N), the associated deduplication ratio may be determined by dividing the storage capacity required to store the respective user client state before the deduplication process (i.e., the OTS (224) of the given data backup (202A-202N)) by the storage capacity required to store the respective user client state after the deduplication process. For example, an original user client state (before the deduplication process) may require a storage capacity of 10 Terabytes (TB). The associated deduplicated user client state (after the deduplication process), however, may reduce the necessary storage capacity to 1 TB. The resulting deduplication ratio, for the data backup (202A-202N), would be 10:1 and would thus render a ninety percent (90%) savings in the required capacity to store the user client state.

In one embodiment of the invention, the ECC (238) may represent a numerical counter that tracks the total number of backup cycles that have transpired since the activation of the BSS or, alternatively, since an initial configuration and synchronization of the backup schedule across the various user clients. The ECC (238) may update (e.g., increment by one) every time a backup cycle elapses. Further, the ECC (238) may be updated by the SBH following the deduplication and consolidation of every user client state (associated with one or more user clients) submitted to the BSS during a given backup cycle.

In one embodiment of the invention, the CCI (240) may be an identifier corresponding (or assigned) to a presently-transpiring backup cycle (described above). A presently-transpiring backup cycle may also be referred to herein as a most recent backup cycle, thereby representing a backup cycle during which a most recent set of user client state is being or has been consolidated. For user client state being consolidated during the most recent backup cycle, the CCI (240) may be recorded as the BCI (222) of the associated data backup (202A-202N). Further, the CCI (224) may be expressed by a string of characters (e.g., letters, numbers, symbols, etc.) that uniquely identify the most recent backup cycle. The CCI (224) may be generated and assigned to the most recent backup cycle by the SBH and/or the administrator client (see e.g., FIG. 1). By way of an example, the BCI (222) may be an alphanumeric tag, or may be a N-bit integer (where N>0) expressed in hexadecimal notation.

Figure 3A:
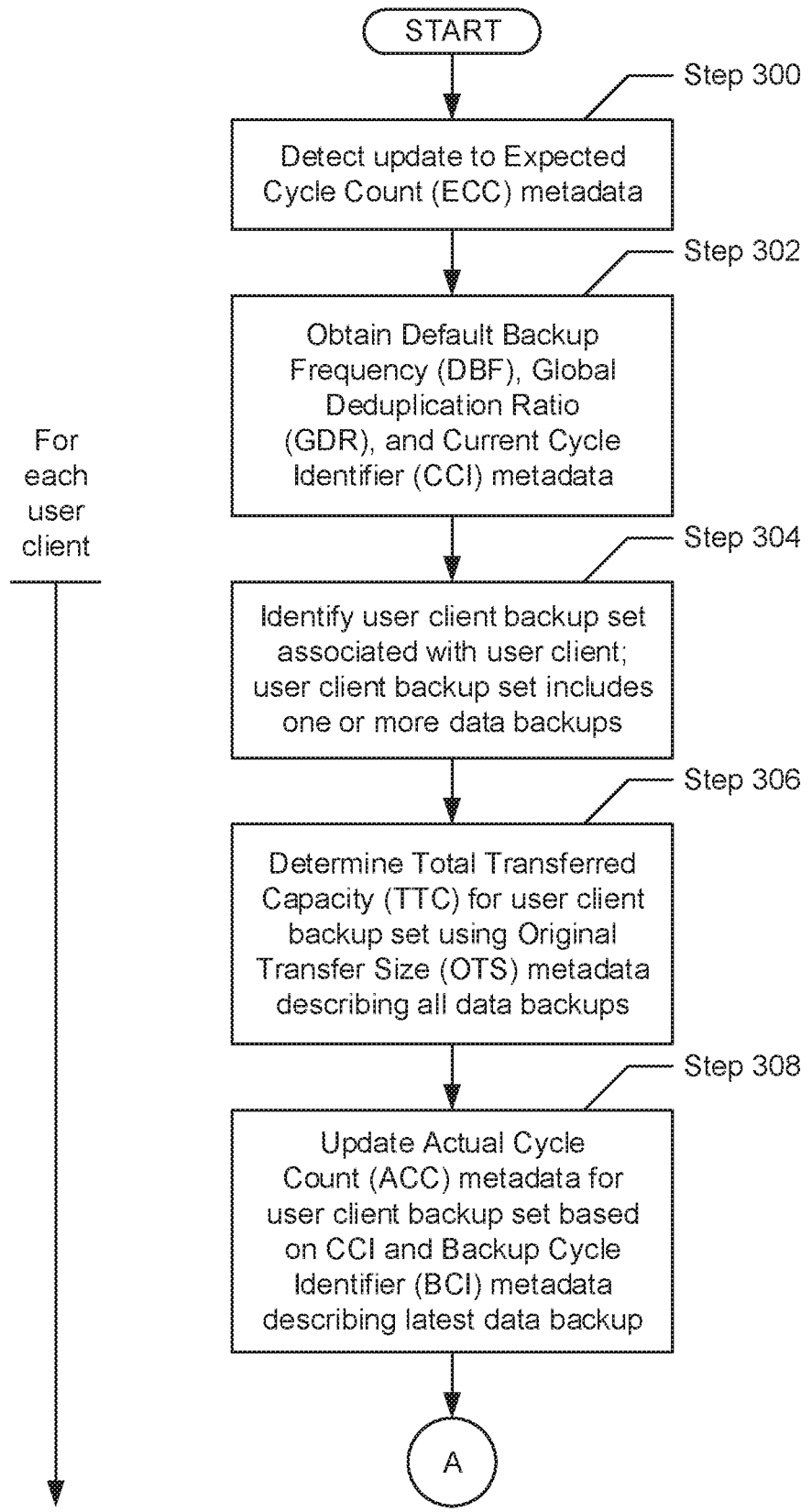
FIGS. 3A-3C show flowcharts describing a method for estimating a storage exhaustion timeline triggered by a new data backup in accordance with one or more embodiments of the invention.
Figure 3B:
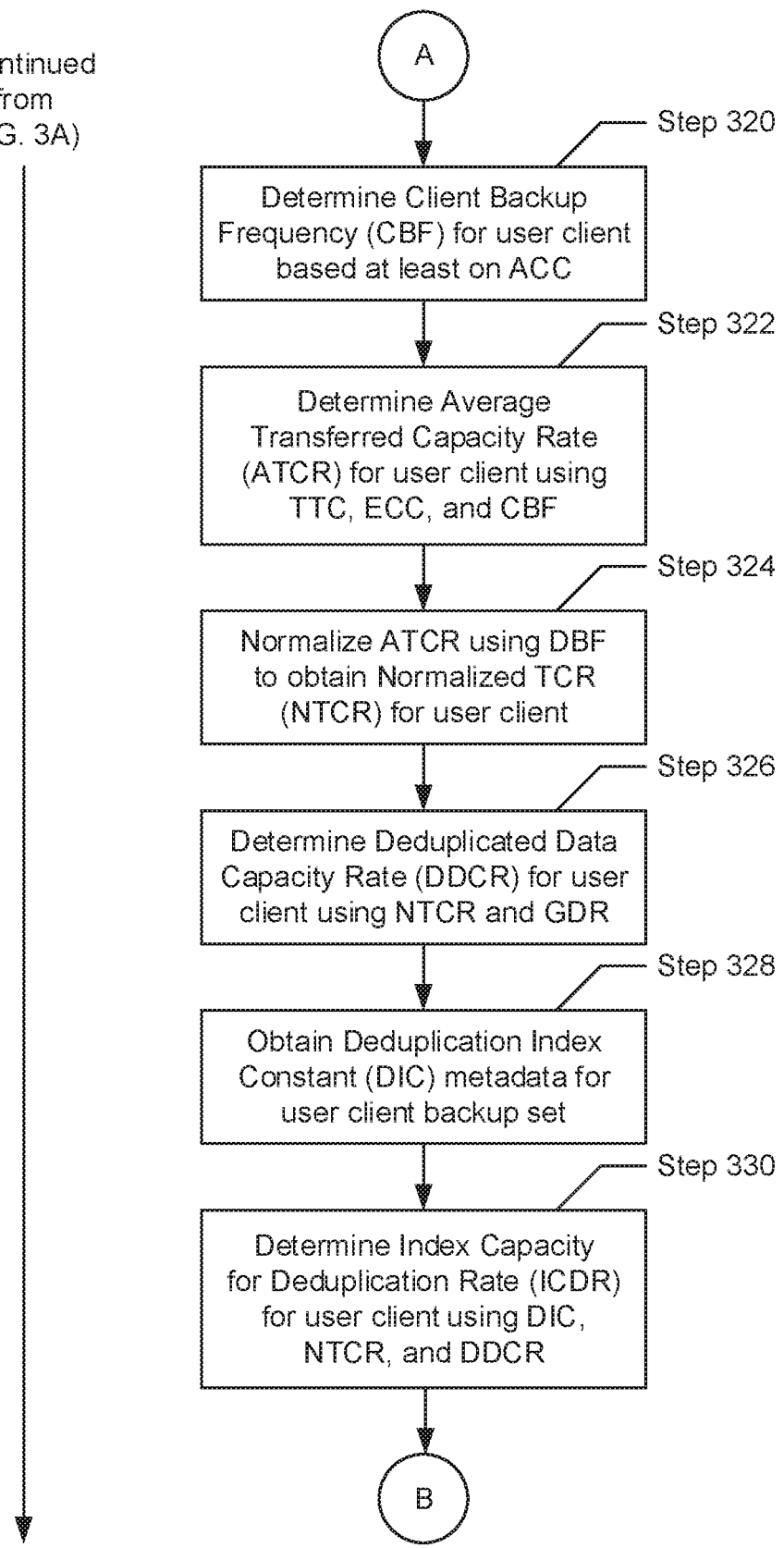
Figure 3C:
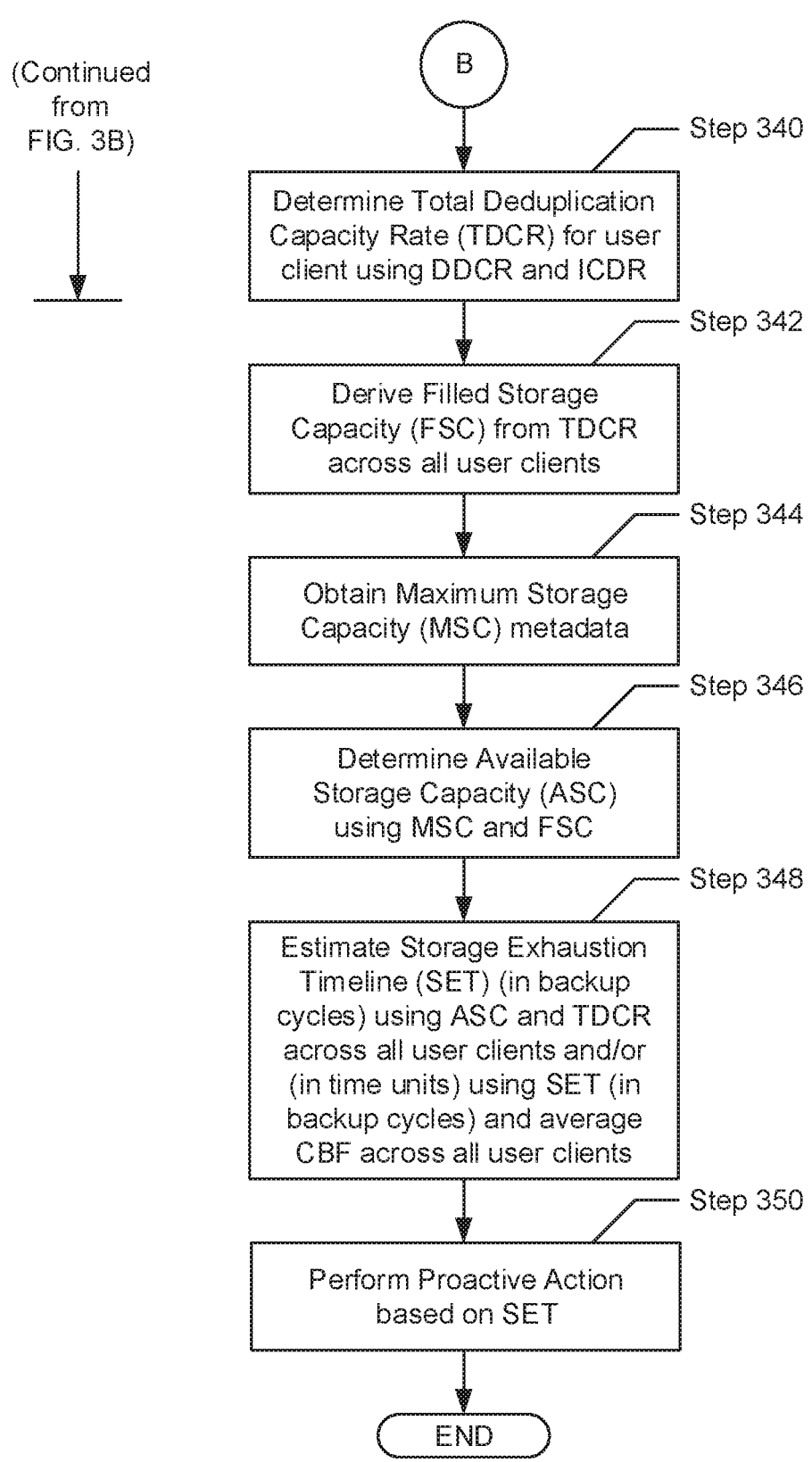

FIGS. 3A-3C show flowcharts describing a method for estimating a storage exhaustion timeline triggered by a new data backup in accordance with one or more embodiments of the invention. The various steps outlined below may be performed by the storage exhaustion analyzer (SEA) (see e.g., FIG. 1). Further, while the various steps in the flowcharts are presented and described sequentially, one of ordinary skill will appreciate that some or all steps may be executed in different orders, may be combined or omitted, and some or all steps may be executed in parallel.

Turning to FIG. 3A, in Step 300, an update to an expected cycle count (ECC) metadata item is detected. In one embodiment of the invention, the ECC may represent a numerical counter that tracks the total number of backup cycles that have transpired. Further, the ECC may be updated by the storage backup handler (SBH) (see e.g., FIG. 1) following the deduplication and consolidation of every user client state (associated with one or more user clients) submitted to the backup storage system (BSS) during a most recent backup cycle.

In Step 302, in response to the ECC update (detected in Step 300), various storage system tier metadata are obtained. Specifically, in one embodiment of the invention, the metadata obtained includes the default backup frequency (DBF), the global deduplication ratio (GDR), and the current cycle identifier (CCI). Each of these metadata items are described in further detail above with respect to FIG. 2.

Hereinafter, the following subset of steps (i.e., Steps 304 through 340) are to be performed for each user client serviced or operatively connected to the BSS. With that said, in Step 304, a user client backup set, allocated on the BSS, is identified. In one embodiment of the invention, the user client backup set may encompass one or more data backups, capturing various user client state, associated with a user client.

In Step 306, a total transferred capacity (TTC), for the user client backup set (identified in Step 304), is determined. In one embodiment of the invention, the TTC may represent the total storage capacity that would have been required to store the pre-deduplicated user client state represented by all data backups specified in the user client backup set. Further, the storage capacity required to store pre-deduplicated user client state associated with a given data backup may be recorded under the original transfer size (OTS) metadata item pertaining to the given data backup. Accordingly, determining the TTC may entail retrieving the OTS value for each data backup specified in the user client backup set and, subsequently, calculating the summation of those retrieved OTS values. For example, assume a user client backup set includes four data backups, where the OTS for those four data backups are recorded as 20 terabytes (TB), 45 TB, 10 TB, and 35 TB, respectively. Subsequently, the TTC for the user client backup set would be represented through the sum of these four OTS values (i.e., 20 TB+45 TB+10 TB+35 TB=110 TB).

In Step 308, an actual cycle count (ACC) metadata item, associated with the user client backup set (identified in Step 304), is updated. In one embodiment of the invention, the ACC may represent a numerical counter that tracks the number of backup cycles during which a given user client submits user client state for consolidation on the BSS. Specifically, in one embodiment of the invention, the user client, associated with the identified user client backup set, may have submitted user client state to the BSS during the most recent backup cycle. In such an embodiment, the ACC may be updated (e.g., incremented by one). Alternatively, in another embodiment of the invention, the user client may not have submitted any user client state to the BSS for consolidation. In this latter embodiment, the ACC may remain unchanged (i.e., may not be updated).

Further, in determining whether to update the ACC, a comparison may be performed between the CCI (obtained in Step 302) and a backup cycle identifier (BCI) associated with the most recently consolidated data backup of the user client backup set. The BCI may be an identifier corresponding (or assigned) to a backup cycle with which the aforementioned most recently consolidated data backup may be associated. Based on the comparison, in one embodiment of the invention, if the BCI matches the CCI, then the most recently consolidated data backup, of the identified user client backup set, had been consolidated during the most recent backup cycle; and accordingly, the ACC may be updated. On the other hand, in another embodiment of the invention, if the BCI alternatively mismatches the CCI, then the most recently consolidated data backup, of the identified user client backup set, may have been consolidated during a previous (i.e., not the most recent) backup cycle; and accordingly, the ACC may not be updated.

Turning to FIG. 3B, in Step 320, a client backup frequency (CBF), for the user client, is determined. In one embodiment of the invention, the CBF may represent the number of times, in a given time duration, that the user client submitted user client state to the BSS. The aforementioned given time duration—e.g., hours, days, weeks, etc.—may be specified by an administrator of the BSS and/or datacenter. Further, determining the CBF may entail dividing the ACC (obtained in Step 308) by the ECC (monitored in Step 300). Thus, the CBF may also be perceived as a ratio capturing the number of backup cycles during which the user client submitted user client state to the total number of backup cycles that have transpired overall.

In Step 322, an average transferred capacity rate (ATCR), for the user client, is determined. In one embodiment of the invention, the ATCR may represent a measure that relates the amount of storage capacity that would have been required to store pre-deduplicated user client state (i.e., user client state not yet subjected to the data deduplication process), submitted by the user client, to the total number of backup cycles that have transpired overall. That is, the ATCR captures the average (i.e., arithmetic mean) pre-deduplicated user client state upload size per backup cycle. Further, the ATCR may be determined using the TTC (determined in Step 306), the ECC (monitored in Step 300), and the CBF (determined in Step 320); and may be expressed in units of bytes per backup cycle (or bytes per cycle). Thereafter, in Step 324, a normalized transferred capacity rate (NTCR), for the user client, is obtained. In one embodiment of the invention, obtaining the NTCR may entail normalizing the ATCR (determined in Step 322) using the DBF (obtained in Step 302).

In Step 326, a deduplicated data capacity rate (DDCR), for the user client, is subsequently determined. In one embodiment of the invention, the DDCR may represent a measure that relates the amount of storage capacity consumed to store deduplicated data (see e.g., FIG. 2), which at least in part forms each data backup of the user client backup set (identified in Step 304), to the total number of backup cycles that have transpired overall. That is, the DDCR captures the average (i.e., arithmetic mean) deduplicated data storage size per backup cycle. Further, the DDCR may be determined using the NTCR (obtained in Step 324) and the GDR (obtained in Step 302); and may be expressed in units of bytes per backup cycle (or bytes per cycle).

In Step 328, a deduplication index constant (DIC), for the user client backup set, is obtained. In one embodiment of the invention, the DIC may track the ratio between storage capacity consumed by deduplication indices and storage capacity consumed by deduplicated data, across the user client backup set (identified in Step 304), for the user client. By way of an example, the DIC associated with consolidated data for a given user client may be represented through the unitless numerical value of 0.1, which would indicate that, for the given user client, the storage capacity consumed by deduplication indices included in the user client backup set is representative of one-tenth (i.e., $\frac{1}{10}^{th}$) of the storage capacity consumed by deduplicated data included in the user client backup set. Deduplication indices and deduplicated data is described in further detail above with respect to FIG. 2.

In Step 330, an index capacity for deduplication rate (ICDR), for the user client, is determined. In one embodiment of the invention, the ICDR may represent a measure that relates the amount of storage capacity consumed to store the deduplication index (see e.g., FIG. 2), which at least in part forms each data backup of the user client backup set (identified in Step 304), to the total number of backup cycles that have transpired overall. That is, the ICDR captures the average (i.e., arithmetic mean) deduplication index storage size per backup cycle. Further, the ICDR may be determined using the DIC (obtained in Step 328), the NTCR (obtained in Step 324), and the DDCR (determined in Step 326); and may be expressed in units of bytes per backup cycle (or bytes per cycle).

Turning to FIG. 3C, in Step 340, a total deduplication capacity rate (TDCR), for the user client, is determined. In one embodiment of the invention, the TDCR may represent a measure that relates the amount of storage capacity consumed to store both deduplicated data and the deduplication index (see e.g., FIG. 2), which together form each data backup of the user client backup set (identified in Step 304), to the total number of backup cycles that have transpired overall. That is, the TDCR captures the average (i.e., arithmetic mean) data backup storage size per backup cycle. Further, the TDCR may be determined through the summation of the DDCR (determined in Step 326) and the ICDR (determined in Step 330); and, accordingly, may be expressed in units of bytes per backup cycle (or bytes per cycle).

In Step 342, after performing each of Steps 304 through 340 for each of the user clients, a filled storage capacity (FSC) is derived. In one embodiment of the invention, the FSC may represent the total storage capacity consumed by all the user client backup sets allocated on the BSS. Accordingly, deriving the FSC may entail summing each of the TDCRs (determined in Step 340) for each of the user clients, respectively, together. For example, with two user client backup sets allocated on the BSS, which consume 20 gigabytes (GB) and 30 GB, respectively, of storage capacity, the FSC would be the sum of these storage capacities (i.e., 20 GB+30 GB=50 GB).

In Step 344, a maximum storage capacity (MSC) metadata item is obtained. In one embodiment of the invention, the MSC may be a numerical value that captures the total storage capacity of the BSS, across all physical storage devices that constitute the BSS. Thereafter, in Step 346, an available storage capacity (ASC), for the BSS, is determined. Specifically, in one embodiment of the invention, the ASC may represent the difference between the MSC (obtained in Step 344) and the FSC (derived in Step 342) and, thus, refers to the total unused storage capacity remaining on the BSS.

In Step 348, a storage exhaustion timeline (SET), for the BSS, is estimated. In one embodiment of the invention, the SET may be an indicator for approximating the depletion of available storage capacity on the BSS based on the data backup dynamics of the various user clients. Accordingly, estimating the SET, which, in one embodiment of the invention, may be expressed in backup cycles, may entail dividing the ASC (determined in Step 346) by the overall TDCR (determined in Step 340) across all the user clients. In another embodiment of the invention, the SET (expressed in backup cycles) may be further divided by the average CBF accounting for all user clients, to obtain the SET (expressed in a given time duration). The given time duration may be the time duration used to express the average CBF—e.g., hours, days, weeks, etc. Therefore, the SET may estimate the depletion of available storage capacity with respect to backup cycles or with respect to time.

In Step 350, based on the SET (estimated in Step 348), one or more proactive actions is/are performed. In one embodiment of the invention, a proactive action may refer to the issuance of an alert and/or an automated corrective response directed to mitigating the upcoming depletion of available storage capacity. Further, the triggering of the performance of a proactive action may be contingent on a threshold storage exhaustion deadline, which may be established by an administrator of the BSS and/or datacenter.

By way of an example, a proactive action may be directed to the retention balancing of data backups across the BSS and at least one other secondary storage system. That is, in one embodiment of the invention, an alert may be issued to the administrator client (see e.g., FIG. 1), which may disclose the tentative deadline for the exhaustion of available storage capacity on the BSS. Using this disclosed information, an administrator may opt to transfer at least a portion of the existing backed-up user client state, respective to one or more user clients, to one or more other storage platforms, in order to postpone, prolong, or extend the tentative deadline for storage capacity exhaustion on the BSS. In another embodiment of the invention, transferal of at least a portion of the existing backup-up user client state may be performed automatically. In such an embodiment, the SEA, executing on the BSS, may be granted authority to connect with one or more secondary storage systems and, subsequently, transfer select data backups to other storage infrastructure. The other storage infrastructure may reside in datacenters or in cloud computing environments.

By way of another example, a proactive action may be directed to the expansion of the available storage capacity on the BSS. That is, in one embodiment of the invention, an alert may be issued to the administrator client (see e.g., FIG. 1), which may disclose the tentative deadline for the exhaustion of available storage capacity on the BSS. Using this disclosed information, an administrator may opt to procure additional storage capacity, thereby postponing, prolonging, or extending the tentative deadline for storage capacity exhaustion on the BSS. Procurement of additional storage capacity may entail the ordering and installation of additional physical storage devices to augment the BSS, if the BSS is implemented in a datacenter or, alternatively, may entail the allocation of additional virtual storage should the BSS be implemented in a cloud computing environment. In another embodiment of the invention, procurement of additional storage capacity may be performed automatically. In such an embodiment, the SEA, executing on the BSS, may be granted authority to order additional physical storage devices or virtual storage through a marketplace.

By way of another example, a proactive action may be directed to the deletion of select data backups consolidated in the BSS. That is, in one embodiment of the invention, an alert may be issued to the administrator client (see e.g., FIG. 1), which may disclose the tentative deadline for the exhaustion of available storage capacity on the BSS. Using this disclosed information, an administrator may opt to delete at least a portion of the existing backed-up user client state, respective to one or more user clients. The select data backups that may be deleted may be chosen based on a retention or consolidation timestamp associated with the data backups. For example, data backups that have been retained in the BSS for more than a specified amount of time (e.g., a year or more) may be selected for deletion, thereby freeing up storage capacity and postponing, prolonging, or extending the tentative deadline for storage capacity exhaustion on the BSS. In another embodiment of the invention, deletion of select data backups may be performed automatically. In such an embodiment, the SEA, executing on the BSS, may be programmed to follow deletion policies directed to removing data backups that may have been retained on the BSS for more than a threshold period of time.

By way of another example, a proactive action may be directed to the migration of select data backups, consolidated in the BSS, to other storage mediums. That is, in one embodiment of the invention, an alert may be issued to the administrator client (see e.g., FIG. 1), which may disclose the tentative deadline for the exhaustion of available storage capacity on the BSS. Using this disclosed information, an administrator may opt to transfer at least a portion of the existing backed-up user client state, respective to one or more user clients, to other remote backup storage mediums such as, for example, magnetic tape devices, optical drive devices, and other archival storage devices. Further, the select data backups that may be transferred may be chosen based on a retention or consolidation timestamp associated with the data backups. For example, data backups that have been retained in the BSS for more than a specified amount of time (e.g., a year or more) may be selected for migration and consolidation in remote archival storage. This migration may thus free up storage capacity on the BSS, thereby postponing, prolonging, or extending the tentative deadline for storage capacity exhaustion on the BSS. In another embodiment of the invention, the migration of selected data backups to remote archival storages may be performed automatically. In such an embodiment, the SEA, executing on the BSS, may be programmed to select data backups based on a specified criteria (e.g., retention time exceeding a threshold period of time) and, subsequently, transfer those select data backups from the BSS to one or more remote archival storages.

Figure 4:
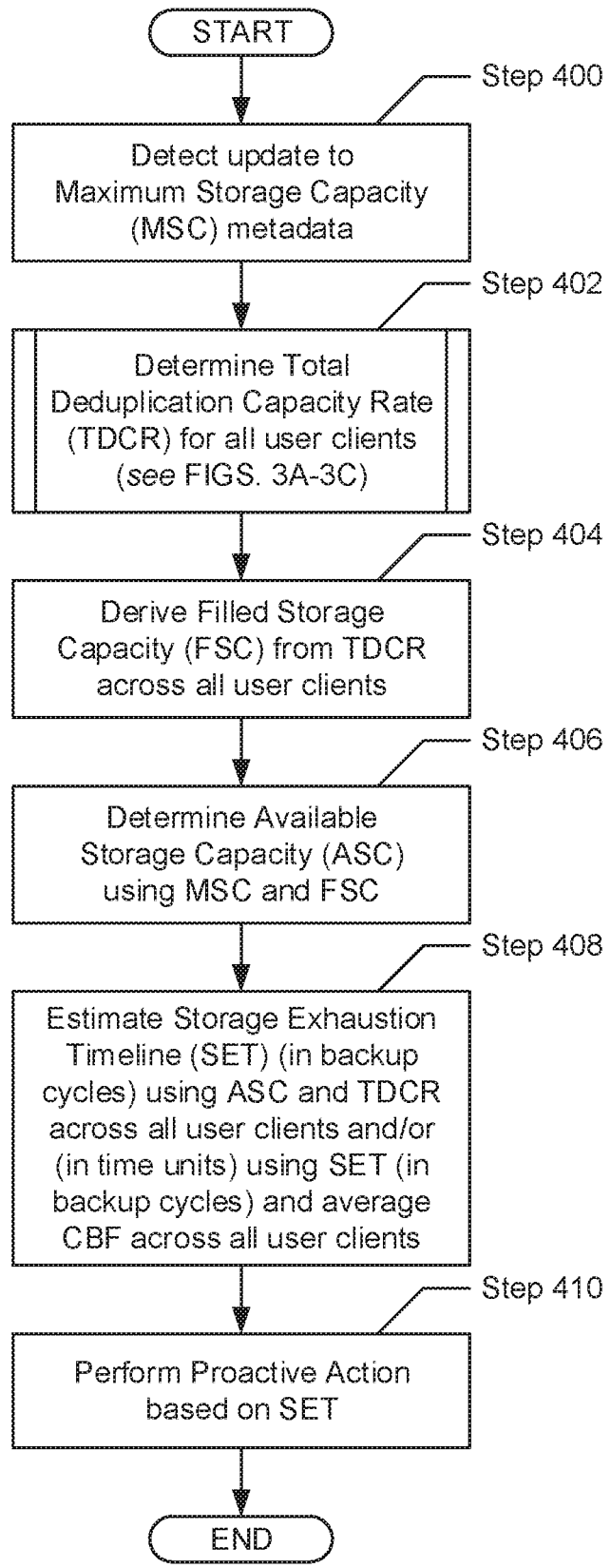
FIG. 4 shows a flowchart describing a method for estimating a storage exhaustion timeline triggered by additional storage capacity in accordance with one or more embodiments of the invention.

FIG. 4 shows a flowchart describing a method for estimating a storage exhaustion timeline triggered by additional storage capacity in accordance with one or more embodiments of the invention. The various steps outlined below may be performed by the storage exhaustion analyzer (SEA) (see e.g., FIG. 1). Further, while the various steps in the flowcharts are presented and described sequentially, one of ordinary skill will appreciate that some or all steps may be executed in different orders, may be combined or omitted, and some or all steps may be executed in parallel.

Turning to FIG. 4, in Step 400, an update to a maximum storage capacity (MSC) metadata item is detected. In one embodiment of the invention, the MSC may be a numerical value that captures the total storage capacity of the backup storage system (BSS) (see e.g., FIG. 1), across all physical storage devices that constitute the BSS. Further, the MSC may be have been updated by an administrator of the BSS or, alternatively, by a computer process executing on the BSS, following the integration of additional storage capacity into the BSS. Integration of additional storage capacity may entail the installation of one or more additional physical storage devices, which at least in part constitute the BSS.

In Step 402, a total deduplication capacity rate (TDCR), for all user clients serviced by or operatively connected to the BSS, is determined. In one embodiment of the invention, the TDCR for each user client may represent a measure that relates the amount of storage capacity consumed to store both deduplicated data and the deduplication index (see e.g., FIG. 2), which together form each data backup of the user client backup set associated with a user client, to the total number of backup cycles that have transpired overall. That is, the TDCR may capture the average (i.e., arithmetic mean) data backup storage size per backup cycle for a given user client. Determining the TDCR, for a given user client, is described in further detail above with respect to FIGS. 3A-3C (i.e., Steps 304 through 340).

In Step 404, a filled storage capacity (FSC) is derived. In one embodiment of the invention, the FSC may represent the total storage capacity consumed by all the user client backup sets allocated on the BSS. Accordingly, deriving the FSC may entail summing each of the TDCRs (determined in Step 402) for each of the user clients, respectively, together. For example, with two user client backup sets allocated on the BSS, which consume 20 gigabytes (GB) and 30 GB, respectively, of storage capacity, the FSC would be the sum of these storage capacities (i.e., 20 GB+30 GB=50 GB).

In Step 406, an available storage capacity (ASC), for the BSS, is determined. Specifically, in one embodiment of the invention, the ASC may represent the difference between a maximum storage capacity (MSC) and the FSC (derived in Step 404) and, thus, refers to the total unused storage capacity remaining on the BSS. Further, the MSC may be a numerical value that captures the total storage capacity of the BSS, across all physical storage devices that constitute the BSS.

In Step 408, a storage exhaustion timeline (SET), for the BSS, is estimated. In one embodiment of the invention, the SET may be an indicator for approximating the depletion of available storage capacity on the BSS based on the data backup dynamics of the various user clients. Accordingly, estimating the SET, which, in one embodiment of the invention, may be expressed in backup cycles, may entail dividing the ASC (determined in Step 406) by the overall TDCR (determined in Step 402) across all the user clients. In another embodiment of the invention, the SET (expressed in backup cycles) may be further divided by the average client backup frequency (CBF) accounting for all user clients, to obtain the SET (expressed in a given time duration). The given time duration may be the time duration used to express the average CBF—e.g., hours, days, weeks, etc. Therefore, the SET may estimate the depletion of available storage capacity with respect to backup cycles or with respect to time.

In Step 410, based on the SET (estimated in Step 408), one or more proactive actions is/are performed. In one embodiment of the invention, a proactive action may refer to the issuance of an alert and/or an automated corrective response directed to mitigating the upcoming depletion of available storage capacity. Further, the triggering of the performance of a proactive action may be contingent on a threshold storage exhaustion deadline, which may be established by an administrator of the BSS and/or datacenter.

By way of an example, a proactive action may be directed to the retention balancing of data backups across the BSS and at least one other secondary storage system. That is, in one embodiment of the invention, an alert may be issued to the administrator client (see e.g., FIG. 1), which may disclose the tentative deadline for the exhaustion of available storage capacity on the BSS. Using this disclosed information, an administrator may opt to transfer at least a portion of the existing backed-up user client state, respective to one or more user clients, to one or more other storage platforms, in order to postpone, prolong, or extend the tentative deadline for storage capacity exhaustion on the BSS. In another embodiment of the invention, transferal of at least a portion of the existing backup-up user client state may be performed automatically. In such an embodiment, the SEA, executing on the BSS, may be granted authority to connect with one or more secondary storage systems and, subsequently, transfer select data backups to other storage infrastructure.

By way of another example, a proactive action may be directed to the expansion of the available storage capacity on the BSS. That is, in one embodiment of the invention, an alert may be issued to the administrator client (see e.g., FIG. 1), which may disclose the tentative deadline for the exhaustion of available storage capacity on the BSS. Using this disclosed information, an administrator may opt to procure additional storage capacity, thereby postponing, prolonging, or extending the tentative deadline for storage capacity exhaustion on the BSS. Procurement of additional storage capacity may entail the ordering and installation of additional physical storage devices to augment the BSS, if the BSS is implemented in a datacenter or, alternatively, may entail the allocation of additional virtual storage should the BSS be implemented in a cloud computing environment. In another embodiment of the invention, procurement of additional storage capacity may be performed automatically. In such an embodiment, the SEA, executing on the BSS, may be granted authority to order additional physical storage devices or virtual storage through a marketplace.

By way of another example, a proactive action may be directed to the deletion of select data backups consolidated in the BSS. That is, in one embodiment of the invention, an alert may be issued to the administrator client (see e.g., FIG. 1), which may disclose the tentative deadline for the exhaustion of available storage capacity on the BSS. Using this disclosed information, an administrator may opt to delete at least a portion of the existing backed-up user client state, respective to one or more user clients. The select data backups that may be deleted may be chosen based on a retention or consolidation timestamp associated with the data backups. For example, data backups that have been retained in the BSS for more than a specified amount of time (e.g., a year or more) may be selected for deletion, thereby freeing up storage capacity and postponing, prolonging, or extending the tentative deadline for storage capacity exhaustion on the BSS. In another embodiment of the invention, deletion of select data backups may be performed automatically. In such an embodiment, the SEA, executing on the BSS, may be programmed to follow deletion policies directed to removing data backups that may have been retained on the BSS for more than a threshold period of time.

By way of another example, a proactive action may be directed to the migration of select data backups, consolidated in the BSS, to other storage mediums. That is, in one embodiment of the invention, an alert may be issued to the administrator client (see e.g., FIG. 1), which may disclose the tentative deadline for the exhaustion of available storage capacity on the BSS. Using this disclosed information, an administrator may opt to transfer at least a portion of the existing backed-up user client state, respective to one or more user clients, to other remote backup storage mediums such as, for example, magnetic tape devices, optical drive devices, and other archival storage devices. Further, the select data backups that may be transferred may be chosen based on a retention or consolidation timestamp associated with the data backups. For example, data backups that have been retained in the BSS for more than a specified amount of time (e.g., a year or more) may be selected for migration and consolidation in remote archival storage. This migration may thus free up storage capacity on the BSS, thereby postponing, prolonging, or extending the tentative deadline for storage capacity exhaustion on the BSS. In another embodiment of the invention, the migration of selected data backups to remote archival storages may be performed automatically. In such an embodiment, the SEA, executing on the BSS, may be programmed to select data backups based on a specified criteria (e.g., retention time exceeding a threshold period of time) and, subsequently, transfer those select data backups from the BSS to one or more remote archival storages.

Figure 5:
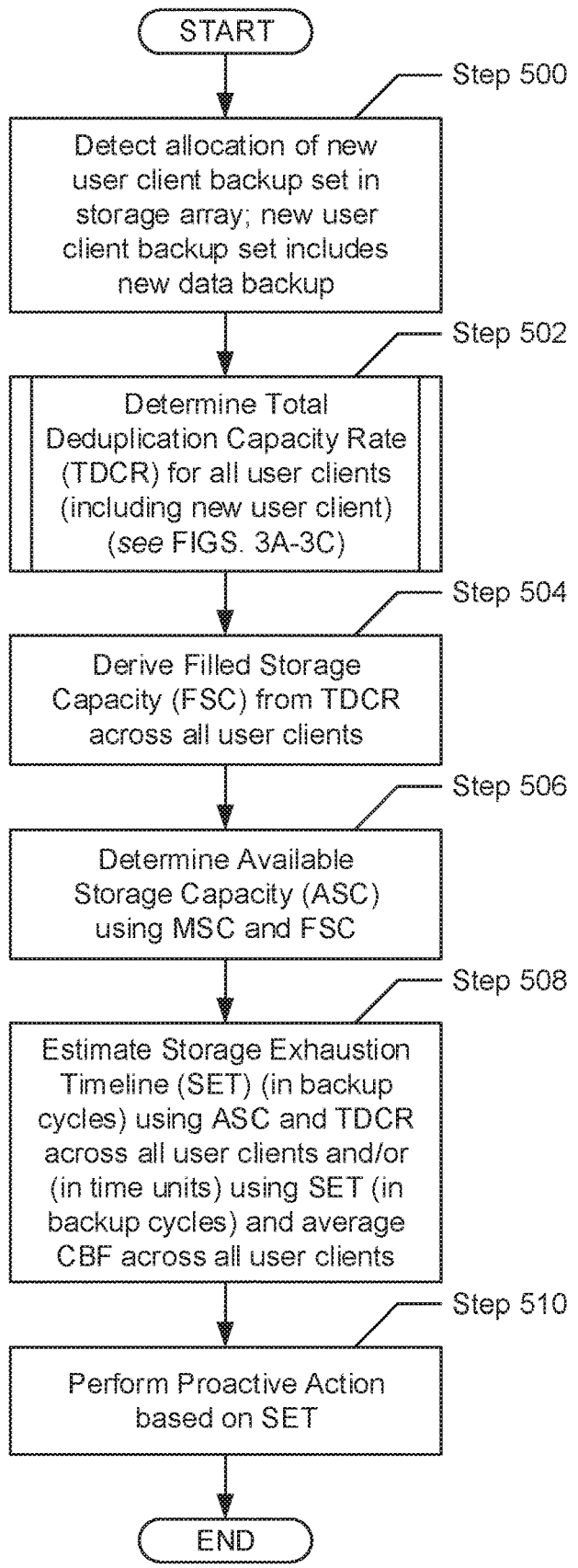
FIG. 5 shows a flowchart describing a method for estimating a storage exhaustion timeline triggered by a new user client in accordance with one or more embodiments of the invention.

FIG. 5 shows a flowchart describing a method for estimating a storage exhaustion timeline triggered by a new user client in accordance with one or more embodiments of the invention. The various steps outlined below may be performed by the storage exhaustion analyzer (SEA) (see e.g., FIG. 1). Further, while the various steps in the flowcharts are presented and described sequentially, one of ordinary skill will appreciate that some or all steps may be executed in different orders, may be combined or omitted, and some or all steps may be executed in parallel.

Turning to FIG. 5, in Step 500, the allocation of a new user client backup set, in the backup storage system (BSS), is detected. In one embodiment of the invention, the new user client backup set may be allocated, by the storage backup handler (SBH) executing on the BSS, following the receipt of user client state belonging to a new user client.

In Step 502, a total deduplication capacity rate (TDCR), for all user clients serviced by or operatively connected to the BSS, is determined. In one embodiment of the invention, the TDCR for each user client may represent a measure that relates the amount of storage capacity consumed to store both deduplicated data and the deduplication index (see e.g., FIG. 2), which together form each data backup of the user client backup set associated with a user client, to the total number of backup cycles that have transpired overall. That is, the TDCR may capture the average (i.e., arithmetic mean) data backup storage size per backup cycle for a given user client. Determining the TDCR, for a given user client, is described in further detail above with respect to FIGS. 3A-3C (i.e., Steps 304 through 340).

In Step 504, a filled storage capacity (FSC) is derived. In one embodiment of the invention, the FSC may represent the total storage capacity consumed by all the user client backup sets allocated on the BSS. Accordingly, deriving the FSC may entail summing each of the TDCRs (determined in Step 402) for each of the user clients, respectively, together. For example, with two user client backup sets allocated on the BSS, which consume 20 gigabytes (GB) and 30 GB, respectively, of storage capacity, the FSC would be the sum of these storage capacities (i.e., 20 GB+30 GB=50 GB).

In Step 506, an available storage capacity (ASC), for the BSS, is determined. Specifically, in one embodiment of the invention, the ASC may represent the difference between a maximum storage capacity (MSC) and the FSC (derived in Step 504) and, thus, refers to the total unused storage capacity remaining on the BSS. Further, the MSC may be a numerical value that captures the total storage capacity of the BSS, across all physical storage devices that constitute the BSS.

In Step 508, a storage exhaustion timeline (SET), for the BSS, is estimated. In one embodiment of the invention, the SET may be an indicator for approximating the depletion of available storage capacity on the BSS based on the data backup dynamics of the various user clients. Accordingly, estimating the SET, which, in one embodiment of the invention, may be expressed in backup cycles, may entail dividing the ASC (determined in Step 506) by the overall TDCR (determined in Step 502) across all the user clients. In another embodiment of the invention, the SET (expressed in backup cycles) may be further divided by the average client backup frequency (CBF) accounting for all user clients, to obtain the SET (expressed in a given time duration). The given time duration may be the time duration used to express the average CBF—e.g., hours, days, weeks, etc. Therefore, the SET may estimate the depletion of available storage capacity with respect to backup cycles or with respect to time.

In Step 510, based on the SET (estimated in Step 508), one or more proactive actions is/are performed. In one embodiment of the invention, a proactive action may refer to the issuance of an alert and/or an automated corrective response directed to mitigating the upcoming depletion of available storage capacity. Further, the triggering of the performance of a proactive action may be contingent on a threshold storage exhaustion deadline, which may be established by an administrator of the BSS and/or datacenter.

By way of an example, a proactive action may be directed to the retention balancing of data backups across the BSS and at least one other secondary storage system. That is, in one embodiment of the invention, an alert may be issued to the administrator client (see e.g., FIG. 1), which may disclose the tentative deadline for the exhaustion of available storage capacity on the BSS. Using this disclosed information, an administrator may opt to transfer at least a portion of the existing backed-up user client state, respective to one or more user clients, to one or more other storage platforms, in order to postpone, prolong, or extend the tentative deadline for storage capacity exhaustion on the BSS. In another embodiment of the invention, transferal of at least a portion of the existing backup-up user client state may be performed automatically. In such an embodiment, the SEA, executing on the BSS, may be granted authority to connect with one or more secondary storage systems and, subsequently, transfer select data backups to other storage infrastructure.

By way of another example, a proactive action may be directed to the expansion of the available storage capacity on the BSS. That is, in one embodiment of the invention, an alert may be issued to the administrator client (see e.g., FIG. 1), which may disclose the tentative deadline for the exhaustion of available storage capacity on the BSS. Using this disclosed information, an administrator may opt to procure additional storage capacity, thereby postponing, prolonging, or extending the tentative deadline for storage capacity exhaustion on the BSS. Procurement of additional storage capacity may entail the ordering and installation of additional physical storage devices to augment the BSS, if the BSS is implemented in a datacenter or, alternatively, may entail the allocation of additional virtual storage should the BSS be implemented in a cloud computing environment. In another embodiment of the invention, procurement of additional storage capacity may be performed automatically. In such an embodiment, the SEA, executing on the BSS, may be granted authority to order additional physical storage devices or virtual storage through a marketplace.

By way of another example, a proactive action may be directed to the deletion of select data backups consolidated in the BSS. That is, in one embodiment of the invention, an alert may be issued to the administrator client (see e.g., FIG. 1), which may disclose the tentative deadline for the exhaustion of available storage capacity on the BSS. Using this disclosed information, an administrator may opt to delete at least a portion of the existing backed-up user client state, respective to one or more user clients. The select data backups that may be deleted may be chosen based on a retention or consolidation timestamp associated with the data backups. For example, data backups that have been retained in the BSS for more than a specified amount of time (e.g., a year or more) may be selected for deletion, thereby freeing up storage capacity and postponing, prolonging, or extending the tentative deadline for storage capacity exhaustion on the BSS. In another embodiment of the invention, deletion of select data backups may be performed automatically. In such an embodiment, the SEA, executing on the BSS, may be programmed to follow deletion policies directed to removing data backups that may have been retained on the BSS for more than a threshold period of time.

By way of another example, a proactive action may be directed to the migration of select data backups, consolidated in the BSS, to other storage mediums. That is, in one embodiment of the invention, an alert may be issued to the administrator client (see e.g., FIG. 1), which may disclose the tentative deadline for the exhaustion of available storage capacity on the BSS. Using this disclosed information, an administrator may opt to transfer at least a portion of the existing backed-up user client state, respective to one or more user clients, to other remote backup storage mediums such as, for example, magnetic tape devices, optical drive devices, and other archival storage devices. Further, the select data backups that may be transferred may be chosen based on a retention or consolidation timestamp associated with the data backups. For example, data backups that have been retained in the BSS for more than a specified amount of time (e.g., a year or more) may be selected for migration and consolidation in remote archival storage. This migration may thus free up storage capacity on the BSS, thereby postponing, prolonging, or extending the tentative deadline for storage capacity exhaustion on the BSS. In another embodiment of the invention, the migration of selected data backups to remote archival storages may be performed automatically. In such an embodiment, the SEA, executing on the BSS, may be programmed to select data backups based on a specified criteria (e.g., retention time exceeding a threshold period of time) and, subsequently, transfer those select data backups from the BSS to one or more remote archival storages.

Figure 6:
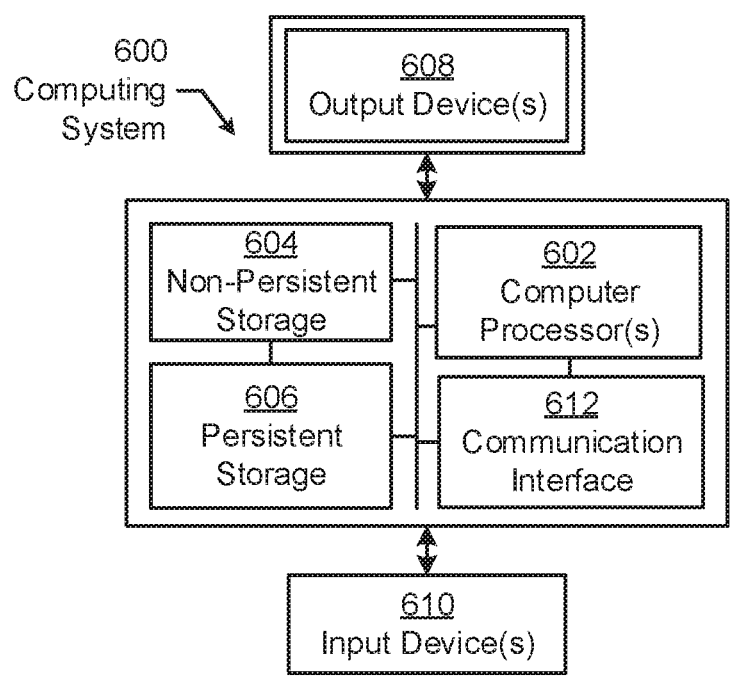
FIG. 6 shows a computing system in accordance with one or more embodiments of the invention.

FIG. 6 shows a computing system in accordance with one or more embodiments of the invention. The computing system (600) may include one or more computer processors (602), non-persistent storage (604) (e.g., volatile memory, such as random access memory (RAM), cache memory), persistent storage (606) (e.g., a hard disk, an optical drive such as a compact disk (CD) drive or digital versatile disk (DVD) drive, a flash memory, etc.), a communication interface (612) (e.g., Bluetooth interface, infrared interface, network interface, optical interface, etc.), input devices (610), output devices (608), and numerous other elements (not shown) and functionalities. Each of these components is described below.

In one embodiment of the invention, the computer processor(s) (602) may be an integrated circuit for processing instructions. For example, the computer processor(s) may be one or more cores or micro-cores of a processor. The computing system (600) may also include one or more input devices (610), such as a touchscreen, keyboard, mouse, microphone, touchpad, electronic pen, or any other type of input device. Further, the communication interface (612) may include an integrated circuit for connecting the computing system (600) to a network (not shown) (e.g., a local area network (LAN), a wide area network (WAN) such as the Internet, mobile network, or any other type of network) and/or to another device, such as another computing device.

In one embodiment of the invention, the computing system (600) may include one or more output devices (608), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (602), non-persistent storage (604), and persistent storage (606). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other non-transitory computer readable medium. Specifically, the software instructions may correspond to computer readable program code that, when executed by a processor(s), is configured to perform one or more embodiments of the invention.

FIGS. 7A-7G show various aspects of an example scenario in accordance with one or more embodiments of the invention. The following example scenario, presented in conjunction with components shown in FIGS. 7A-7G, is for explanatory purposes only and not intended to limit the scope of the invention.

Figure 7A:
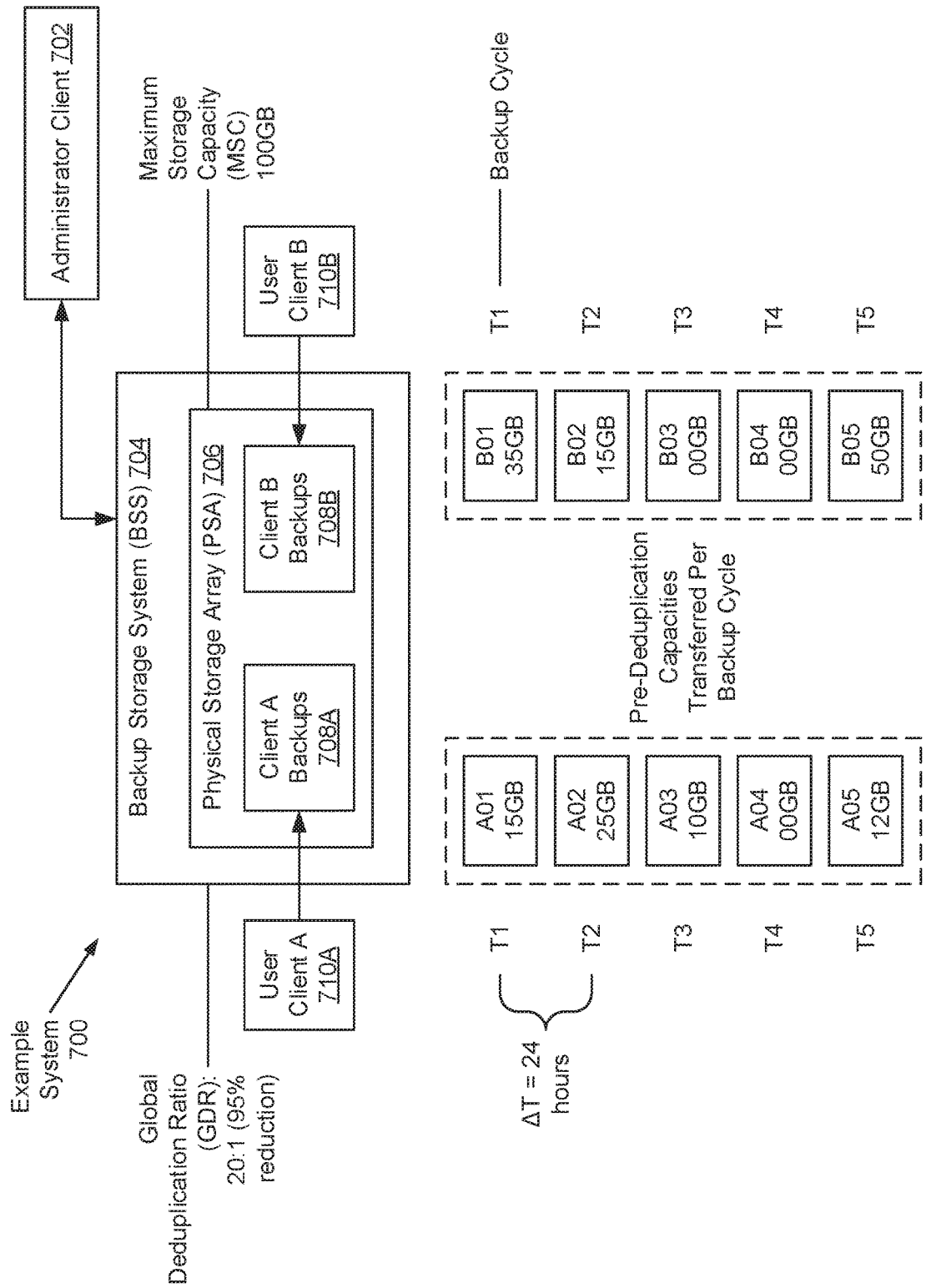

Turning to FIG. 7A, an example system (700) is portrayed, which includes an administrator client (702) and two user clients (710A, 710B) operatively connected to a backup storage system (BSS) (704). The BSS (704) includes a physical storage array (PSA) (706) whereon client backups (708A, 708B) respective to the aforementioned two user clients (710A, 710B) are consolidated. Further, the maximum storage capacity (MSC) associated with the PSA (706) is one-hundred gigabytes (i.e., 100 GB), whereas the global deduplication ratio (GDR) associated with the BSS (704) is 20:1, thereby yielding a ninety-five percent (95%) savings in the required storage capacity to store the user client state from either of the two user clients (710A, 710B).

FIG. 7A further depicts, for each backup cycle of five backup cycles (i.e., T1-T5), a submission of pre-deduplicated user client state to the BSS (704) from the two user clients (710A, 710B). That is, for the five noted backup cycles, the first user client (710A) has submitted user client state representative of 15 GB, 25 GB, 10 GB, 0 GB, and 12 GB, respectively, of storage capacity. Similarly, for the five noted backup cycles, the second user client (710B) has submitted user client state representative of 35 GB, 15 GB, 0 GB, 0 GB, and 50 GB, respectively, of storage capacity. Moreover, the backup cycle interval between backup cycles has been configured to twenty-four hours (or one day).

Hereinafter, FIGS. 7B-7F outline the various calculations performed, in accordance with embodiments of the invention, to determine the total transferred capacity (TTC), client backup frequency (CBF), normalized transferred capacity rate (NTCR), deduplicated data capacity rate (DDCR), and index capacity for deduplication rate (ICDR), for the two user clients (710A, 710B), for the five above-mentioned backup cycles (i.e., T1-T5). The various calculations illustrated throughout FIGS. 7B-7F coincide with Step 306 through Step 330 outlined above in FIGS. 3A and 3B.

Turning to FIG. 7G, the derivation of the storage exhaustion timeline (SET), respective to each of the five above-mentioned backup cycles (i.e., T1-T5), is shown. The derivations coincide with Step 340 through Step 348 outlined above in FIG. 3C. Further, for this example, (i) the SET during the first backup cycle T1 is estimated to be approximately 29 backup cycles; (ii) the SET during the second backup cycle T2 is estimated to be approximately 32 backup cycles; (iii) the SET during the third backup cycle T3 is estimated to be approximately 52 backup cycles; (iv) the SET during the fourth backup cycle T4 is estimated to be approximately 91 backup cycles; and (v) the SET during the fifth backup cycle T5 is estimated to be approximately 63 backup cycles.

That is, the available storage capacity (i.e., 100 GB) of the PSA (706) would deplete in: 29 backup cycles based on the backup dynamics of the two user clients (710A, 710B) observed during the first backup cycle T1; 32 backup cycles based on the backup dynamics of the two user clients (710A, 710B) observed during the second backup cycle T2; 52 backups cycles based on the backup dynamics of the two user clients (710A, 710B) observed during the third backup cycle T3; 91 backup cycles based on the backup dynamics of the two user clients (710A, 710B) observed during the fourth backup cycle T4; and 63 backup cycles based on the backup dynamics of the two user clients (710A, 710B) observed during the fifth backup cycle T5.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for estimating storage exhaustion, comprising:
    detecting an update to a backup expected cycle count (ECC);
    based on detecting the ECC update:
        identifying, stored on a storage array, a first user client backup set associated with a first user client and a second user client backup set associated with a second user client;
        determining, for the first user client, a first total deduplication capacity rate (TDCR) based at least on metadata describing the first user client backup set;
        determining, for the second user client, a second TDCR based at least on metadata describing the second user client backup set;
        estimating a first storage exhaustion timeline (SET) from at least the first TDCR per backup cycle and the second TDCR; and
        performing a first proactive action based on the first SET, wherein the first proactive action comprises one selected from a group consisting of transferring at least a portion of user client backup data from the storage array to a secondary storage array and removing the at least portion of user client backup data from the storage array,
    wherein determining the first TDCR for the first user client based at least on metadata describing the first user client backup set, comprises:
        determining a total transferred capacity (TTC) using original transfer size (OTS) metadata for each data backup of the first user client backup set;
        obtaining, for the first user client, a normalized transferred capacity rate (NTCR);
        determining a deduplicated data capacity rate (DDCR) using the NTCR and a global deduplication ratio (GDR) associated with the storage array;
        determining an index capacity for deduplication rate (ICDR) using a deduplication index constant (DIC) metadata associated with the first user client backup set, the NTCR, and the DDCR; and
        determining the first TDCR from the DDCR and the ICDR.

2. The method of claim 1, wherein the ECC updates after each scheduled backup cycle.

3. The method of claim 1, wherein obtaining the NTCR for the first user client, comprises:
    obtaining an actual cycle count (ACC) associated with the first user client backup set;
    determining, for the first user client, a client backup frequency (CBF) based on the ACC and the ECC;
    determining an average transferred capacity rate (ATCR) using the TTC, the ECC, and the CBF; and
    normalizing the ATCR using a default backup frequency (DBF), to obtain the NTCR.

4. The method of claim 1, wherein estimating the first SET from at least the first TDCR and the second TDCR, comprises:
 deriving a filled storage capacity (F SC) of the storage array from the first TDCR and the second TDCR;
 obtaining a maximum storage capacity (MSC) of the storage array;
 determining an available storage capacity (ASC) of the storage array using the MSC and the FSC; and
 estimating the first SET using the ASC, the first TDCR, and the second TDCR.

5. The method of claim 1, wherein the first SET is expressed in backup cycles.

6. The method of claim 1, further comprising:
 detecting, on the storage array, allocation of a third user client backup set associated with a third user client;
 based on detecting allocation of the third user client backup set:
  determining, for the third user client, a third TDCR based at least on metadata describing the third user client backup set;
  estimating a second SET from at least the first TDCR, the second TDCR, and the third TDCR; and
  performing a second proactive action based on the second SET.

7. The method of claim 1, further comprising:
 detecting an update to storage capacity of the storage array;
 based on detecting the storage capacity update:
  deriving a filled storage capacity (FSC) of the storage array from the first TDCR and the second TDCR;
  obtaining an updated maximum storage capacity (MSC) of the storage array;
  determining an updated available storage capacity (ASC) of the storage array using the updated MSC and the FSC;
  estimating a second SET using the updated ASC, the first TDCR, and the second TDCR; and
  performing a second proactive action based on the second SET.

8. A system, comprising:
 a backup storage system (BSS) comprising a storage exhaustion analyzer (SEA) and a computer processor operatively connected to a storage array;
 a plurality of user clients operatively connected to the BSS; and
 the SEA executing on the computer processor, and programmed to:
  detect an update to an expected cycle count (ECC);
  based on detecting the ECC update:
   identify, stored on the storage array, a first user client backup set associated with a first user client of the plurality of user clients and a second user client backup set associated with a second user client of the plurality of user clients;
   determine, for the first user client, a first total deduplication capacity rate (TDCR) based at least on metadata describing the first user client backup set;
   determine, for the second user client, a second TDCR based at least on metadata describing the second user client backup set;
   estimate a first storage exhaustion timeline (SET) from at least the first TDCR and the second TDCR; and
   perform a first proactive action based on the first SET, wherein the first proactive action comprises one selected from a group consisting of transferring at least a portion of user client backup data from the storage array to a secondary storage array and removing the at least portion of user client backup data from the storage array,
   wherein determining the first TDCR for the first user client based at least on metadata describing the first user client backup set, comprises:
    determining a total transferred capacity (TTC) using original transfer size (OTS) metadata for each data backup of the first user client backup set;
    obtaining, for the first user client, a normalized transferred capacity rate (NTCR);
    determining a deduplicated data capacity rate (DDCR) using the NTCR and a global deduplication ratio (GDR) associated with the storage array;
    determining an index capacity for deduplication rate (ICDR) using a deduplication index constant (DIC) metadata associated with the first user client backup set, the NTCR, and the DDCR; and
    determining the first TDCR from the DDCR and the ICDR.

9. The system of claim 8,
 wherein the BSS further comprises a storage backup handler (SBH) that executes on the computer processor,
 wherein the SBH is programmed to update the ECC after processing each scheduled backup cycle.

10. The system of claim 8, further comprising:
 an administrator client operatively connected to the BSS,
 wherein the SEA is further programmed to provide the first SET to the administrator client after estimating the first SET.

11. A non-transitory computer readable medium (CRM) comprising computer readable program code, which when executed by a computer processor, enables the computer processor to:
 detect an update to an expected cycle count (ECC);
 based on detecting the ECC update:
  identify, stored on a storage array, a first user client backup set associated with a first user client and a second user client backup set associated with a second user client;
  determine, for the first user client, a first total deduplication capacity rate (TDCR) based at least on metadata describing the first user client backup set;
  determine, for the second user client, a second TDCR based at least on metadata describing the second user client backup set;
  estimate a first storage exhaustion timeline (SET) from at least the first TDCR and the second TDCR; and
  perform a first proactive action based on the first SET, wherein the first proactive action comprises one selected from a group consisting of transferring at least a portion of user client backup data from the storage array to a secondary storage array and removing the at least portion of user client backup data from the storage array,
  wherein determining the first TDCR for the first user client based at least on metadata describing the first user client backup set, comprises:
   determining a total transferred capacity (TTC) using original transfer size (OTS) metadata for each data backup of the first user client backup set;
   obtaining, for the first user client, a normalized transferred capacity rate (NTCR);

determining a deduplicated data capacity rate (DDCR) using the NTCR and a global deduplication ratio (GDR) associated with the storage array;

determining an index capacity for deduplication rate (ICDR) using a deduplication index constant (DIC) metadata associated with the first user client backup set, the NTCR, and the DDCR; and determining the first TDCR from the DDCR and the ICDR.

12. The non-transitory CRM of claim 11, wherein the ECC updates after each scheduled backup cycle.

13. The non-transitory CRM of claim 11, wherein obtaining the NTCR for the first user client, comprises:

obtaining an actual cycle count (ACC) associated with the first user client backup set;

determining, for the first user client, a client backup frequency (CBF) based on the ACC and the ECC;

determining an average transferred capacity rate (ATCR) using the TTC, the ECC, and the CBF; and normalizing the ATCR using a default backup frequency (DBF), to obtain the NTCR.

14. The non-transitory CRM of claim 11, wherein estimating the first SET from at least the first TDCR and the second TDCR, comprises:

deriving a filled storage capacity (FSC) of the storage array from the first TDCR and the second TDCR;

obtaining a maximum storage capacity (MSC) of the storage array;

determining an available storage capacity (ASC) of the storage array using the MSC and the FSC; and estimating the first SET using the ASC, the first TDCR, and the second TDCR.

15. The non-transitory CRM of claim 11, wherein the first SET is expressed in backup cycles.

16. The non-transitory CRM of claim 11, further comprising computer readable program code, which when executed by the computer processor, enables the computer processor to:

detect, on the storage array, allocation of a third user client backup set associated with a third user client;

based on detecting allocation of the third user client backup set:

determine, for the third user client, a third TDCR based at least on metadata describing the third user client backup set;

estimate a second SET from at least the first TDCR, the second TDCR, and the third TDCR; and perform a second proactive action based on the second SET.

17. The non-transitory CRM of claim 11, further comprising computer readable program code, which when executed by the computer processor, enables the computer processor to:

detect an update to storage capacity of the storage array;

based on detecting the storage capacity update:

derive a filled storage capacity (FSC) of the storage array from the first TDCR and the second TDCR;

obtain an updated maximum storage capacity (MSC) of the storage array;

determine an updated available storage capacity (ASC) of the storage array using the updated MSC and the FSC;

estimate a second SET using the updated ASC, the first TDCR, and the second TDCR; and perform a second proactive action based on the second SET.

* * * * *